(12) United States Patent  (10) Patent No.: US 7,664,308 B2
Isomura  (45) Date of Patent: Feb. 16, 2010

(54) PHOTOMASK INSPECTION APPARATUS COMPARING OPTICAL PROXIMITY CORRECTION PATTERNS TO MINIMUM AND MAXIMUM LIMITS

(75) Inventor: Ikunao Isomura, Kanagawa (JP)

(73) Assignee: Advanced Mask Inspection Technology Inc., Yokohama-shi (JP)

( * ) Notice: Subject to any disclaimer, the term of this patent is extended or adjusted under 35 U.S.C. 154(b) by 674 days.

(21) Appl. No.: 11/283,755

(22) Filed: Nov. 22, 2005

(65) Prior Publication Data

US 2007/0047798 A1  Mar. 1, 2007

(30) Foreign Application Priority Data

Aug. 31, 2005  (JP)  ............... 2005-252617

(51) Int. Cl.
  *G06K 9/00*  (2006.01)
  *H01L 21/66*  (2006.01)
  *G01N 21/00*  (2006.01)
  *G06F 19/00*  (2006.01)

(52) U.S. Cl. .................. 382/144; 382/149; 438/16; 356/237.5; 700/110

(58) Field of Classification Search ............. 382/141, 382/144, 145, 181, 190, 199, 202, 209, 149; 438/14, 16; 356/237.2, 237.5; 700/110
See application file for complete search history.

(56) References Cited

U.S. PATENT DOCUMENTS

| 4,477,926 A | * | 10/1984 | Linger et al. | ............. 382/149 |
| 4,628,531 A | * | 12/1986 | Okamoto et al. | ............. 382/144 |
| 4,648,053 A | * | 3/1987 | Fridge | ............. 382/147 |
| 4,809,341 A | * | 2/1989 | Matsui et al. | ............. 382/144 |
| 4,979,223 A | * | 12/1990 | Manns et al. | ............. 382/149 |

(Continued)

FOREIGN PATENT DOCUMENTS

JP  4-76783  3/1992

(Continued)

OTHER PUBLICATIONS

JPO/INPIT Machine Translation of JP 2001-266126, Okuda, K., Sep. 28, 2001.*

(Continued)

*Primary Examiner*—Bhavesh M Mehta
*Assistant Examiner*—Barry Drennan
(74) *Attorney, Agent, or Firm*—Oblon, Spivak, McClelland, Maier & Neustadt, L.L.P.

(57) ABSTRACT

A pattern inspection apparatus includes an optical image acquiring unit that acquires optical image data of a target plate formed as a pattern. The pattern inspection apparatus also includes a design image data generating unit that generates first design image data based on a first design pattern serving as a base of pattern formation of the target plate. The pattern inspection apparatus additionally includes a comparing unit that compares the optical image data and the first design image data with each other. Further, information of a second design pattern is input in parallel with information of the first design pattern to the pattern inspection apparatus. In the comparing unit, second design image data generated based on the second design pattern is further input, and the optical image data is compared with the second design image data in place of the first design image data.

13 Claims, 17 Drawing Sheets

U.S. PATENT DOCUMENTS

| | | | |
|---|---|---|---|
| 5,386,221 A | | 1/1995 | Allen et al. |
| 5,563,702 A | | 10/1996 | Emery et al. |
| 5,574,800 A | * | 11/1996 | Inoue et al. ............... 382/149 |
| 5,586,058 A | * | 12/1996 | Aloni et al. ................ 702/35 |
| 5,907,628 A | * | 5/1999 | Yolles et al. ............... 382/149 |
| 5,978,501 A | * | 11/1999 | Badger et al. ............... 382/144 |
| 6,072,897 A | | 6/2000 | Greenberg et al. .......... 382/149 |
| 6,275,604 B1 | * | 8/2001 | Miyajima et al. ............ 382/146 |
| 6,347,150 B1 | * | 2/2002 | Hiroi et al. ................. 382/149 |
| 6,483,937 B1 | * | 11/2002 | Samuels ..................... 382/144 |
| 6,522,776 B1 | * | 2/2003 | Ehrichs ....................... 382/144 |
| 6,539,106 B1 | * | 3/2003 | Gallarda et al. ............. 382/149 |
| 6,868,175 B1 | * | 3/2005 | Yamamoto et al. .......... 382/145 |
| 7,127,099 B2 | * | 10/2006 | Noy ............................ 382/149 |
| 2002/0006562 A1 | * | 1/2002 | Akutagawa et al. .......... 430/30 |
| 2002/0181760 A1 | * | 12/2002 | Asai ............................ 382/149 |
| 2003/0200523 A1 | * | 10/2003 | Takahashi et al. ............ 716/19 |
| 2004/0081350 A1 | * | 4/2004 | Kitamura et al. ............ 382/149 |
| 2005/0002554 A1 | * | 1/2005 | Schulze et al. .............. 382/144 |

FOREIGN PATENT DOCUMENTS

| | | |
|---|---|---|
| JP | 8-76359 | 3/1996 |
| JP | 2001-266126 | 9/2001 |
| JP | 2001-272770 | 10/2001 |
| JP | 2002-237445 | 8/2002 |
| JP | 3413110 | 3/2003 |
| JP | 2004-317427 | 11/2004 |

OTHER PUBLICATIONS

JPO/INPIT Machine Translation of JP 2001-272770, Kobayashi et al., Oct. 5, 2001.*

JPO/INPIT Machine Translation of JP 2004-317427 Sawa, E., Nov. 11, 2004.*

* cited by examiner

PHOTOMASK INSPECTION APPARATUS COMPARING OPTICAL PROXIMITY CORRECTION PATTERNS TO MINIMUM AND MAXIMUM LIMITS

CROSS-REFERENCE TO RELATED APPLICATION

This application is based upon and claims the benefit of priority from prior Japanese Patent Application No.2005-252617 filed on Aug. 31, 2005 in Japan, the entire contents of which are incorporated herein by reference.

BACKGROUND OF THE INVENTION

1. Field of the Invention

The present invention relates to a pattern inspection apparatus, a pattern inspection method, or a program which causes a computer to execute the method, such as a pattern inspection technique which inspects a pattern defect of an object serving as a target plate used in manufacturing a semiconductor, and an apparatus which inspects a defect of a considerably small pattern of a photomask, a wafer, or a liquid crystal substrate used in manufacturing a semiconductor device or a liquid crystal display (LCD).

2. Related Art

In recent years, with a high integration density and a large capacity of a large-scale integrated circuit (LSI), a circuit line width required for semiconductor devices has increasingly been narrowed. These semiconductor devices are manufactured such that a pattern is exposed and transferred on a wafer by a reduced projection exposure device called a stepper while using an original pattern with a circuit pattern formed thereupon (The original pattern is also called a mask or a reticle. The original pattern will be generally called as a mask hereinafter.) to form a circuit. Therefore, in manufacturing a mask to transfer the fine circuit pattern on a wafer, a pattern drawing device which can draw a fine circuit pattern is utilized. A pattern drawing device may directly draw a pattern circuit on a wafer. An electronic beam drawing device is also described in references (for example, see Japanese Patent Application, Publication No.2002-237445). Alternatively, in addition to the electronic beam drawing device, a laser beam drawing device which draws a pattern by using a laser beam is under development, and is disclosed in references (for example, see U.S. Pat. No. 5,386,221).

An improvement in yield is essential in manufacturing an LSI which requires a lot of manufacturing cost. However, as represented by a 1-gigabit DRAM (Random Access Memory), the order of a pattern constituting an LSI has been changing from a sub-micron order to a nano order. As one serious factor which decreases a yield, a pattern defect of a mask used when an ultrafine pattern is exposed and transferred on a semiconductor wafer by a photolithography technique is known. In recent years, with a miniaturization of an LSI pattern formed on a semiconductor wafer, a size which must be detected as a pattern defect has also become considerably small. For this reason, a pattern inspection apparatus which inspects a defect of a transfer mask used in manufacturing an LSI must be increased in precision.

On the other hand, with development of multimedia, an LCD (Liquid Crystal Display) has a liquid crystal substrate size of a 500 mm×600 mm or larger, and micropatterning of a TFT (Thin Film Transistor) or the like formed on a liquid crystal substrate advances. Therefore, it is required that a considerably small pattern defect be inspected in a large area. For this reason, development of a pattern inspection apparatus which efficiently inspects a defect of a pattern of a large-area LCD and a photomask used in manufacturing the large-area LCD in a short period of time is urgently required.

In this case, in a conventional pattern inspection apparatus, it is known that an optical image obtained by picking up an image of a pattern formed on a target plate such as a lithography mask or the like at a predetermined magnification by using a magnifying optical system is compared with design data or an optical image obtained by picking up the image of the same pattern on the target plate to perform inspection (for example, see Japanese Patent Application, Publication No.HEI08-76359).

For example, as pattern inspection methods, "die to die inspection" which compares optical image data obtained by picking up images of the same patterns at different places on the same mask and "die to database inspection" which generates design image data based on drawing data (information of a design pattern) obtained by converting CAD data used in drawing a mask pattern into data in an inspection apparatus input format and compares the design image data with optical image data serving as measurement data obtained by picking up the image of a pattern are known. In the inspection methods in the inspection apparatus, a target plate is placed on a stage, and a flux of light scans the target plate as a result of the movement of the stage to perform inspection. The flux of light is irradiated on the target plate from a light source and an illumination optical system. Light transmitted through the target plate or reflected by the target plate is focused on a sensor through an optical system. The image picked by the sensor is transmitted to a comparing circuit as measurement data. In the comparing circuit, after alignment of the images, the measurement data is compared with reference data based on an appropriate algorithm. When the measurement data is different from the reference data, it is determined that a pattern defect is present.

In recent years, the line width of a design pattern has narrowed, the presence of a micropattern for optical proximity correction (OPC) makes it difficult to match the design image data and the optical image data serving as measurement data, and an object which is not desired to be determined as a defect is occasionally determined as a defect (pseudo defect).

To cope with this, a method which automatically detects an OPC pattern from design image data (image data) to decrease the number of pseudo defects is proposed (for example, see Japanese Patent No. 3413110).

When a defect appears in a target plate, a user generally reviews the defect. However, a considerably larger number of micropatterns and the like for the above optical proximity correction (OPC) are arranged (for example, at several ten thousands). For this reason, if all the micropatterns are determined as defects, quantity of work and time required to review the defects by a user exceed their limitations. As described above, when a large number of pseudo defects appear in the target plate, the inspection itself must be disadvantageously performed again. Alternatively, an expensive target plate itself must be disadvantageously manufactured again.

BRIEF SUMMARY OF THE INVENTION

An aspect of the present invention has as its object to provide a method and apparatus which overcome the above problems and perform pattern inspection which decreases the number of pseudo defects.

A pattern inspection apparatus according to an embodiment of the present invention includes:

an optical image acquiring unit which acquires optical image data of a target plate to be inspected, the target plate being formed as a pattern;

a design image data generating unit which generates first design image data based on a first design pattern serving as a base of pattern formation of the target plate; and a comparing unit which compares the optical image data and the first design image data with each other, wherein in the comparing unit, second design image data generated based on a second design pattern is further input, and the optical image data is compared with the second design image data in place of the first design image data.

A pattern inspection method according to an embodiment of the present invention includes:

acquiring optical image data of a target plate to be inspected, the target plate being formed as a pattern;

generating first design image data based on a first design pattern serving as a base of pattern formation of the target plate;

comparing the optical image data and the first design image data with each other;

generating second design image data based on a second design pattern; and comparing the optical image data and the second design image data in place of the first design image data.

A program-recorded readable recording medium according to an embodiment of the present invention, the program which causes a computer, executes:

a storing process in which information of the first design pattern serving as a base of pattern formation on a target plate to be inspected, the target plate being formed as a pattern, and information of a second design pattern different from the first design pattern are stored in a storing device;

a first design imaged at a generating process which generates first design image data based on the first design pattern stored in the storing device;

a first comparing process which receives optical image data of the target plate and compares the optical image data with the first design image data;

a second design image data generating process which generates second design image data based on the second design pattern stored in the storing device; and a second comparing process which compares the optical image data with the second design image data in place of the first design image data.

DETAILED DESCRIPTION OF THE INVENTION

First Embodiment

A first embodiment will describe a configuration in which a second design pattern is prepared in advance independently of a conventional first design pattern in preparation for appearance of many pseudo defects described above in order to suppress the pseudo defects. In this manner, the apparatus can be effectively used.

Figure 1:
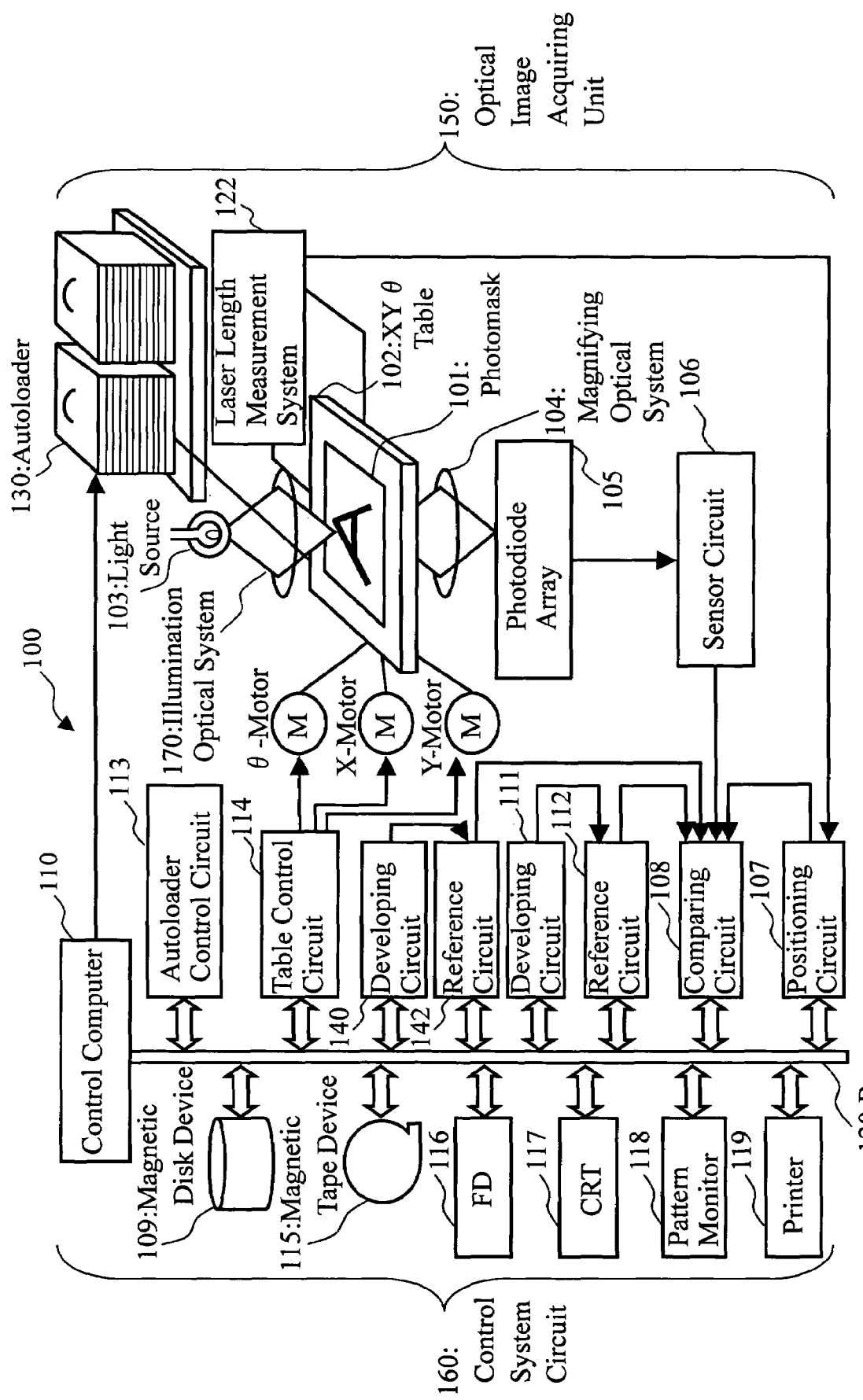
FIG. 1 is a conceptual diagram showing the configuration of a pattern inspection apparatus according to a first embodiment.

FIG. 1 is a conceptual diagram showing the configuration of a pattern inspection apparatus according to the first embodiment.

In FIG. 1, a pattern inspection apparatus 100 which inspects a defect of a substrate such as a mask or a wafer serving as a target plate includes an optical image acquiring unit 150 and a control system circuit 160. The optical image acquiring unit 150 includes an XYθ table 102, a light source 103, a magnifying optical system 104, a photodiode array 105, a sensor circuit 106, a laser length measurement system 122, an autoloader 130, and an illumination optical system 170. In the control system circuit 160, a control calculator 110 serving as a computer is connected, through a bus 120 serving as a data transmission path, to a positioning circuit 107, a comparing circuit 108 serving as an example of a comparing unit; a developing circuit 111 and a reference circuit 112 serving as an example of a first design image data generating unit; a developing circuit 140 and a reference circuit 142 serving as an example of a second design image data generating unit; an autoloader control circuit 113; a table control circuit 114; a magnetic disk device 109, a magnetic tape device 115, and a flexible disk device (FD) 116 serving as an example of a storing device; a CRT 117; a pattern monitor 118; and a printer 119. The XYθ table 102 is driven by an X-axis motor, a Y-axis motor, and a θ-axis monitor. In FIG. 1, units except for constituent units necessary for explaining the first embodiment are not shown. The pattern inspection apparatus 100 generally includes other necessary constituent elements as a matter of course.

Figure 2:
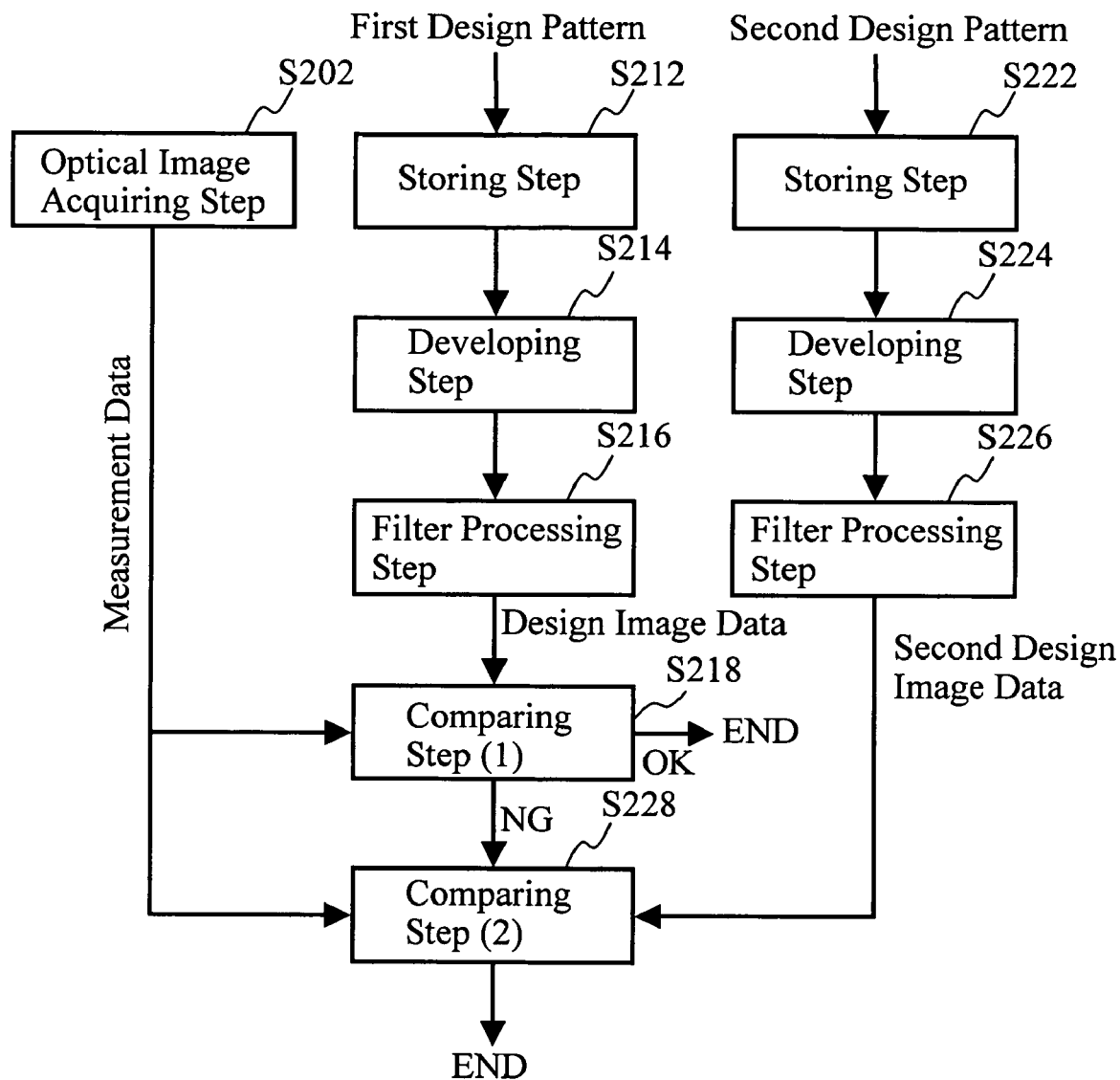
FIG. 2 is a flow chart showing main steps of a pattern inspection method according to the first embodiment.

FIG. 2 is a flow chart showing main steps of a pattern inspection method according to the first embodiment.

In FIG. 2, the pattern inspection method executes a series of steps, i.e., an optical image acquiring step (S202); a first design pattern data storing step (S212); a developing step (S214) serving as an example of the first design image data generating step; a filter processing step (S216), a comparing step (S218); a second design pattern data storing step (S222); another developing step (S224) serving as an example of the second design image data generating step; a filter processing step (S226); and another comparing step (S228).

In S (step) 202, as the optical image acquiring step, the optical image acquiring unit 150 acquires an optical image (measurement data) on a photomask 101 serving as a target plate on which a graphic expressed by graphic data included in first design pattern data are drawn based on the first design pattern data. More specifically, the optical image is acquired as follows.

The photomask 101 serving as a target plate to be inspected is placed on the XYθ table 102 which is arranged such that the XYθ table 102 can be moved in a horizontal direction and a rotating direction by the X-, Y-, and θ-axis motors. On the pattern formed on the photomask 101, light is irradiated by the appropriate light source 103 arranged above the XYθ table 102. A flux of light irradiated from the light source 103 is irradiated on the photomask 101 serving as a target plate through the illumination optical system 170. Below the photomask 101, the magnifying optical system 104, the photodiode array 105, and the sensor circuit 106 are arranged. The light transmitted through the photomask 101 serving as a target plate such as an exposure mask is focused on the photodiode array 105 as an optical image through the magnifying optical system 104 and enters the photodiode array 105. Focal point adjustment of the magnifying optical system 104 may be automatically performed by an automatic focusing mechanism (not shown).

Figure 3:
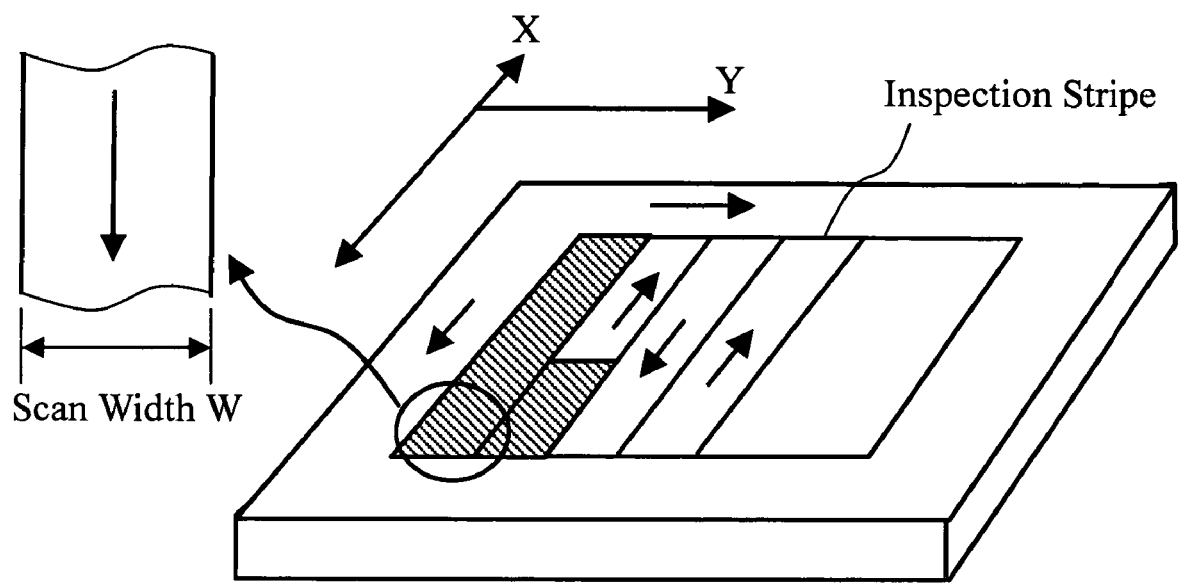
FIG. 3 is a diagram for explaining a procedure of acquiring an optical image.

FIG. 3 is a diagram for explaining a procedure for acquiring an optical image.

A region to be inspected is, as shown in FIG. 3, virtually divided into a plurality of strip-like inspection stripes each having a scan width W in a Y direction, and the operation of the XYθ table 102 is controlled such that the divided inspection stripes are continuously scanned. While the XYθ table 102 moves in the X direction, an optical image is acquired. In the photodiode array 105, images each having a scan width W as shown in FIG. 3 are continuously input. After an image on a first inspection stripe is acquired, images each having the scan width W are continuously input while an image on a second inspection stripe is moved in the reverse direction at this time. When an image on a third inspection stripe is to be acquired, the image is acquired while the image is moved in the direction reverse to the direction for acquiring the image on the second inspection stripe, i.e., the direction for acquiring the image on the first inspection stripe. In this manner, the images are continuously acquired to make it possible to shorten wasteful processing time.

The image of the pattern focused on the photodiode array 105 is photo-electrically converted by the photodiode array 105. Furthermore, the electric image is A/D-converted (analog-digital-converted) by the sensor circuit 106. In the photodiode array 105, a sensor such as a TDI (Time Delay Integrator) sensor is arranged. The XYθ table 102 serving as a stage is continuously moved in the X-axis direction to cause the TDI sensor to pick up the image of the pattern of the photomask 101 serving as a target plate. An inspection optical system having a large magnification is constituted by the light source 103, the magnifying optical system 104, the photodiode array 105, and the sensor circuit 106.

The XYθ table 102 is driven by the table control circuit 114 under the control of the control calculator 110. The XYθ table 102 can be moved by a drive system such as 3-axis (X-Y-θ) motors which drive the XYθ table 102 in the X direction, the Y direction, and the θ direction. As these X motor, Y motor, and θ motor, for example, step motors can be used. A moving position of the XYθ table 102 is measured by the laser length measurement system 122 and supplied to the position circuit 107. The photomask 101 on the XYθ table 102 is automatically carried from the autoloader 130 driven by the autoloader control circuit 113 and automatically discharged upon completion of the inspection.

Measurement data (optical image) output from the sensor circuit 106 is transmitted to the comparing circuit 108 together with data output from the position circuit 107 and representing the position of the photomask 101 on the XYθ table 102. The measurement data is, for example, 8-bit unsigned data, and expresses grayscales of brightness of respective pixels.

In step S212, as the data storing step, information of the first design pattern used in pattern formation for the photomask 101 is stored in the magnetic disk device 109 serving as an example of a storing device (storing unit).

In step S214, as the developing step, the developing circuit 111 reads the information of the first design pattern from the magnetic disk device 109 through the control calculator 110, converts the read first design pattern serving as design graphic data of the photomask 101 serving as a target plate to be inspected into binary or multivalued image data (first design image data). The image data is transmitted to the reference circuit 112.

Figure 4:
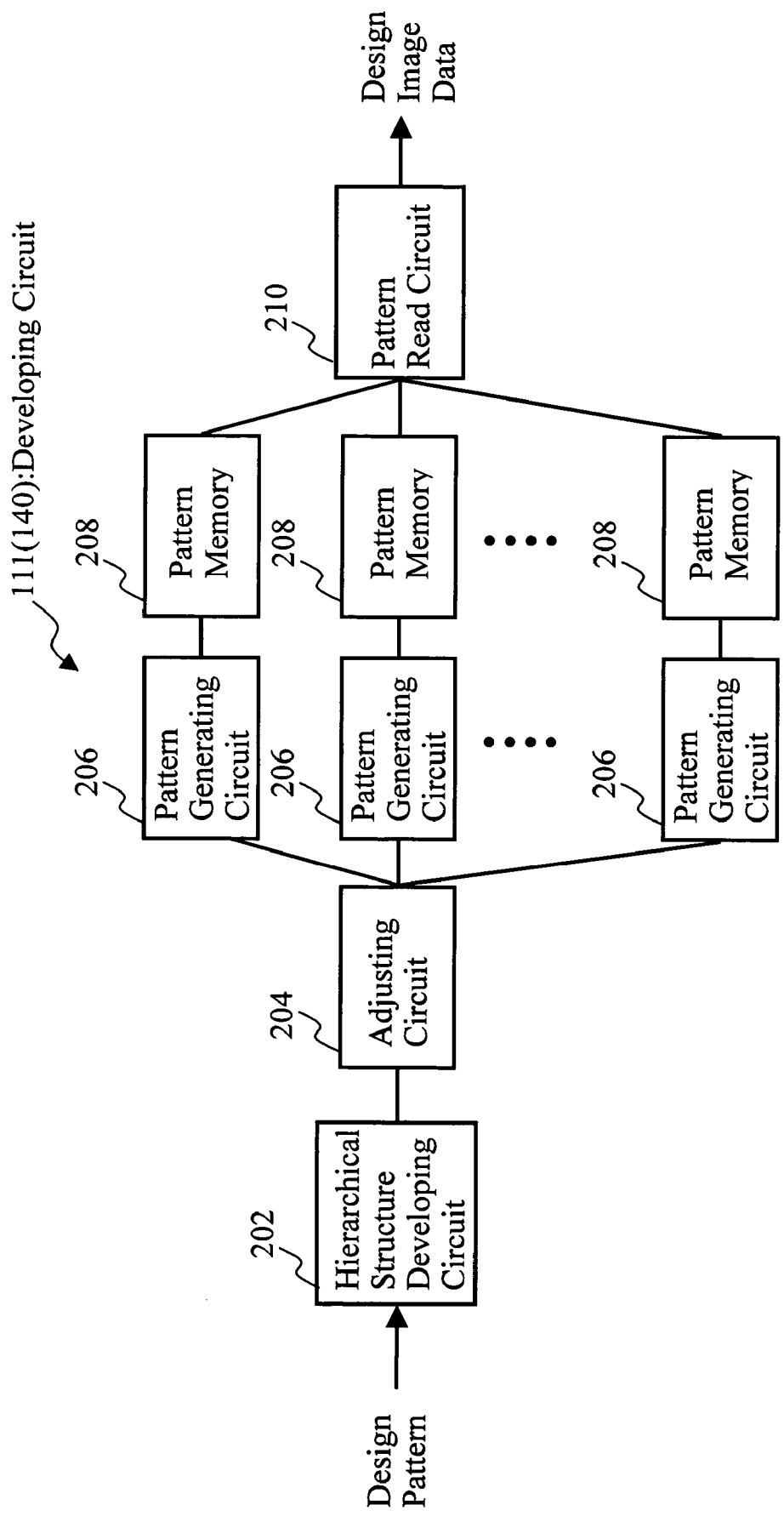
FIG. 4 is a block diagram showing an example of the configuration of a developing circuit.

FIG. 4 is a diagram showing an example of the configuration of the developing circuit.

In FIG. 4, the developing circuit 111 has a hierarchical structure developing circuit 202, an adjusting circuit 204, pattern generating circuits 206, pattern memories 208, and a pattern read circuit 210. The pattern generating circuits 206 and the pattern memories 208 are arranged in a plurality of stages such that each pattern generating circuit 206 and each pattern memory 208 constitute one pair.

In this case, graphics included in the first and second design patterns include rectangles and triangles as basic graphics.

For example, graphic data which defines the shapes, sizes, positions, and the like of pattern graphics by information including coordinates (x, y) at reference positions of the graphics, lengths of sides, and graphic codes serving as identifiers which discriminate graphic types such as a rectangle and a triangle from each other are stored.

When the information of the first design pattern serving as the graphic data is input to the developing circuit 111, the hierarchical structure developing circuit 202 develops the information into data of each graphic and interprets the graphic code representing a graphic shape of the graphic data, a graphic size, and the like. In the pattern generating circuit 206, as a pattern arranged in a grid serving as a unit having a predetermined quantization size, binary or multivalued design image data is developed. The developed design image data is temporarily accumulated in the pattern memory 208. In other words, in the pattern generating circuit 206 serving as an example of an occupation rate calculating unit, the design pattern data is loaded, an occupation rate of a graphic on the design pattern is calculated in each grid obtained by virtually dividing the inspection region in units of predetermined sizes, and n-bit occupation-rate data is output to the pattern memory 208. For example, one grid is preferably set as one pixel. If it is assumed that one pixel has a resolving power of $½^8$ (=$½_{56}$), $½_{56}$ small regions are allocated to the region of the graphics arranged in a pixel to calculate an occupation rate in the pixel. The occupation rate is output to the pattern memory 208 as 8-bit occupation-rate data.

In this case, in order to cause the plurality of pattern generating circuits 206 to efficiently perform a parallel processing operation, the adjusting circuit 204 distributes input data to each of the pattern generating circuits 206. The pattern read circuit 210 reads the occupation-rate data stored in the pattern memory 208. In the pattern read circuit 210, when occupation-rate data is present in the same pixel, the occupation data is added to the read data and read. In this manner, a graphic occupation rate (grayscale value) in each pixel is known.

In step S216, as the filter processing step, the reference circuit 112 performs an appropriate filter processing to first design image data serving as image data of a transmitted graphic.

Figure 5:
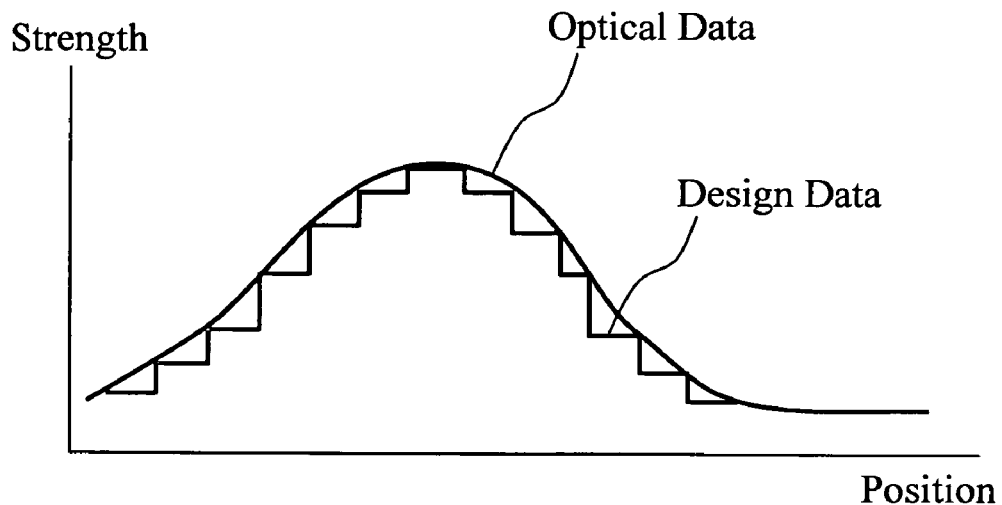
FIG. 5 is a graph for explaining a filter processing.

FIG. 5 is a diagram for explaining the filter processing.

Since measurement data serving as an optical image obtained from the sensor circuit 106 is set in a state in which the filter operates by the resolving characteristics of the magnifying optical system 104, the aperture effect of the photodiode array 105, and the like, in other words, in a continuously changing analog state, a filter processing is also performed to the first design image data serving as image data on a design side having a digital image intensity (gray value) to make it possible to match the first design image data with the measurement data. In this manner, a reference image to be compared with the optical image is formed.

In step S218, as the comparing step (1), the comparing circuit 108 loads an optical image serving as measurement data of a pattern to be inspected generated by the sensor circuit 106 based on a transmitted image obtained from the photomask 101 serving as a target plate and a reference image serving as first design image data generated by the developing circuit 111 and the reference circuit 112, compares these images with each other according to a predetermined algorithm, and determines the presence/absence of a defect.

In this state, a pseudo defect is generated as described above. In the first embodiment, second design image data is generated by using the developing circuit 140 and the reference circuit 142 shown in FIG. 1. As described above, with a miniaturization of a pattern in recent years, it becomes difficult to match the design image data with the measurement data such that a pseudo defect is not generated. This is mostly due to the difficulty of uniform drawing of a pattern on the entire surface of the target plate and local formation of complex patterns. Therefore, although one design image data is used in a conventional comparing process system, in the first embodiment, a comparing process system which uses design image data of two types and compares the data with each other in order to suppress a pseudo defect is established.

Figure 6:
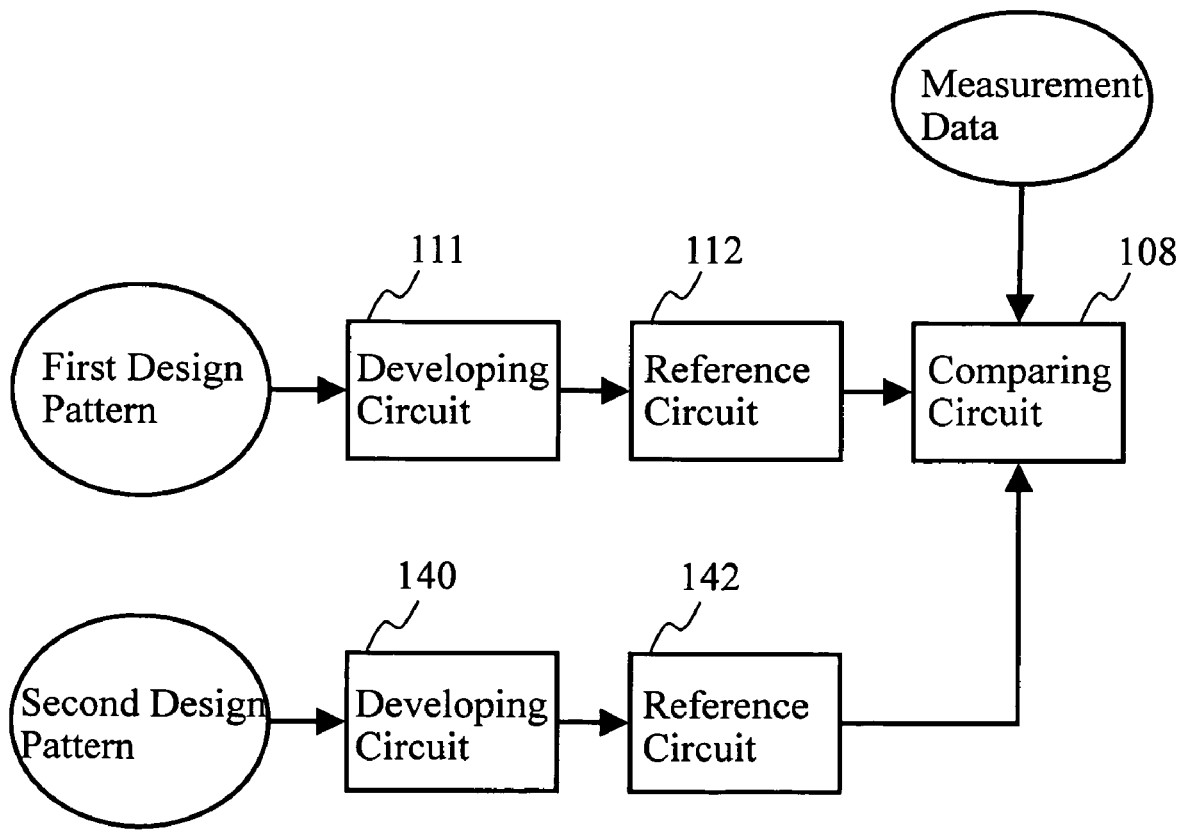
FIG. 6 is a block diagram of a circuit configuration in accordance with the flow chart of the main steps in the pattern inspection method.

FIG. 6 is a block diagram of a circuit configuration according to a flow chart of main steps in the pattern inspection method.

In FIG. 6, the measurement data is transmitted to the comparing circuit 108 as described above. The first design pattern is converted into first design image data by the developing circuit 111 and the reference circuit 112, and the first design image data is transmitted to the comparing circuit 108. On the other hand, the second design pattern is converted into second design image data by the developing circuit 140 and the reference circuit 142 serving as a circuit system different from the first design pattern converting unit, and the second design image data is transmitted to the comparing circuit 108. The first design image data is converted into second design image data by the developing circuit 140 and the reference circuit 142 serving as another circuit system to make it possible to parallelly perform the first design pattern converting process and the second design pattern converting process.

In step S222, as the storing step, the second design pattern data is stored in the magnetic disk device 109 serving as an example of a storing device (storing unit).

In step S224, as the developing step, the developing circuit 140 reads the information of the second design pattern from the magnetic disk device 109 through the control computer 110, the read second design pattern is converted into binary or multivalued image data (second design image data), and the image data is transmitted to the reference circuit 142.

The developing circuit 140, as in the developing circuit 111 explained in FIG. 4, has the hierarchical structure developing circuit 202, the adjusting circuit 204, the pattern generating circuits 206, the pattern memories 208, and the pattern read circuit 210. The pattern generating circuits 206 and the pattern memories 208 are arranged in a plurality of stages such that each pattern generating circuit 206 and each pattern memory 208 constitute one pair.

Like the graphics included in the first design pattern, the graphics included in the second design pattern include rectangles and triangles as basic graphics. For example, graphic data which defines the shapes, sizes, positions, and the like of pattern graphics by information including coordinates (x, y) at reference positions of the graphics, lengths of sides, and graphic codes serving as identifiers which discriminate graphic types such as a rectangle and a triangle from each other are stored.

When the information of the second design pattern serving as the graphic data is input to the developing circuit 140, the hierarchical structure developing circuit 202 develops the information into data of each graphic and interprets the graphic code representing a graphic shape of the graphic data, a graphic size, and the like. In the pattern generating circuit 206, as a pattern arranged in a grid serving as a unit having a predetermined quantization size, binary or multivalued design image data is developed. The developed design image data is temporarily accumulated in the pattern memory 208. In other words, in the pattern generating circuit 206 serving as an example of an occupation rate calculating unit, the information of the design pattern is loaded, an occupation rate of a graphic on the design pattern data is calculated in each grid obtained by virtually dividing the inspection region in units of predetermined sizes, and n-bit occupation-rate data is output to the pattern memory 208. For example, one grid is preferably set as one pixel. If it is assumed that one pixel has a resolving power of $1/2^8$ (=$1/256$), $1/256$ small regions are allocated to the region of the graphics arranged in a pixel to calculate an occupation rate in the pixel. The occupation rate is output to the pattern memory 208 as 8-bit occupation-rate data.

In order to cause the plurality of pattern generating circuits 206 to efficiently perform a parallel processing operation, the adjusting circuit 204 distributes input data to the respective pattern generating circuits 206. The pattern read circuit 210 reads the occupation rate data stored in the pattern memories 208. In the pattern read circuit 210, when occupation-rate data is present in the same pixel, the occupation data is added to the read data and read. In this manner, a graphic occupation rate (grayscale value) in each pixel is known.

In step S216, as the filter processing step, the reference circuit 112 performs an appropriate filter processing to first design image data serving as image data of a transmitted graphic.

As explained in FIG. 5, the filter processing is also performed to the second design image data serving as image data on a design side having a digital image intensity (gray value), like the first design image data, to make it possible to match the second design image data with the measurement data. In this manner, a second reference image to be compared with the optical image is formed.

In step S228, as the comparing step (2), the comparing circuit 108 loads an optical image serving as measurement data of a pattern to be inspected generated by the sensor circuit 106 based on a transmitted image obtained from the photomask 101 serving as a target plate and a reference image serving as second design image data generated by the developing circuit 140 and the reference circuit 142, compares these images with each other according to a predetermined algorithm, and determines the presence/absence of a defect.

In this case, the measurement data may be constantly compared with the two design image data. As shown in FIG. 2, when a defective portion (NG) is generated in comparison between the measurement data and the first design image data, the measurement data is preferably compared with the second design image data in consideration of time required for the comparing process. In other words, in the comparing circuit 108, when the measurement data serving as optical image data is compared with the first design image data, if the resultant difference exceeds a predetermined threshold value, the measurement data is compared with the second design image data in place of the first design image data. Furthermore, only the detected defective portion is preferably compared with the second design image data in consideration of time required for the comparing process.

Here, a pattern in which a pseudo defect is likely to be generated when the measurement data is compared with only the first design image data and inspected will be described below.

Figure 7:
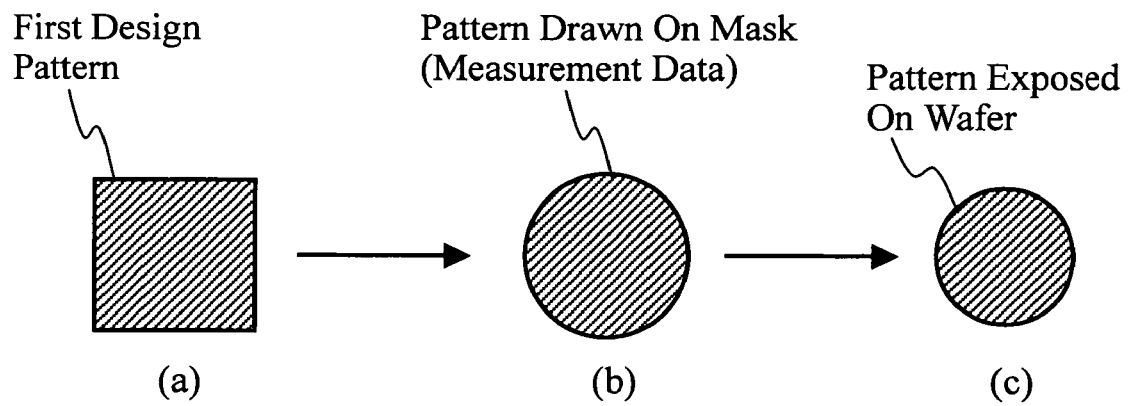
FIG. 7 are diagrams for explaining drawing states of a design pattern.

FIG. 7 are diagrams for explaining a drawing state of a design pattern.

For example, when a rectangular pattern as shown at part a of FIG. 7 is drawn on a mask serving as a target plate by a drawing device, the corners round as shown at part b of FIG. 7 to make the pattern almost circular. When a wafer or the like is exposed by using the mask, as shown at part c of FIG. 7, the wafer is exposed in an almost circular shape as shown at part c of FIG. 7. Therefore, the first design pattern is corrected by using an optical proximity correction (OPC) technique to maintain the rectangular pattern until the wafer.

Figure 8:
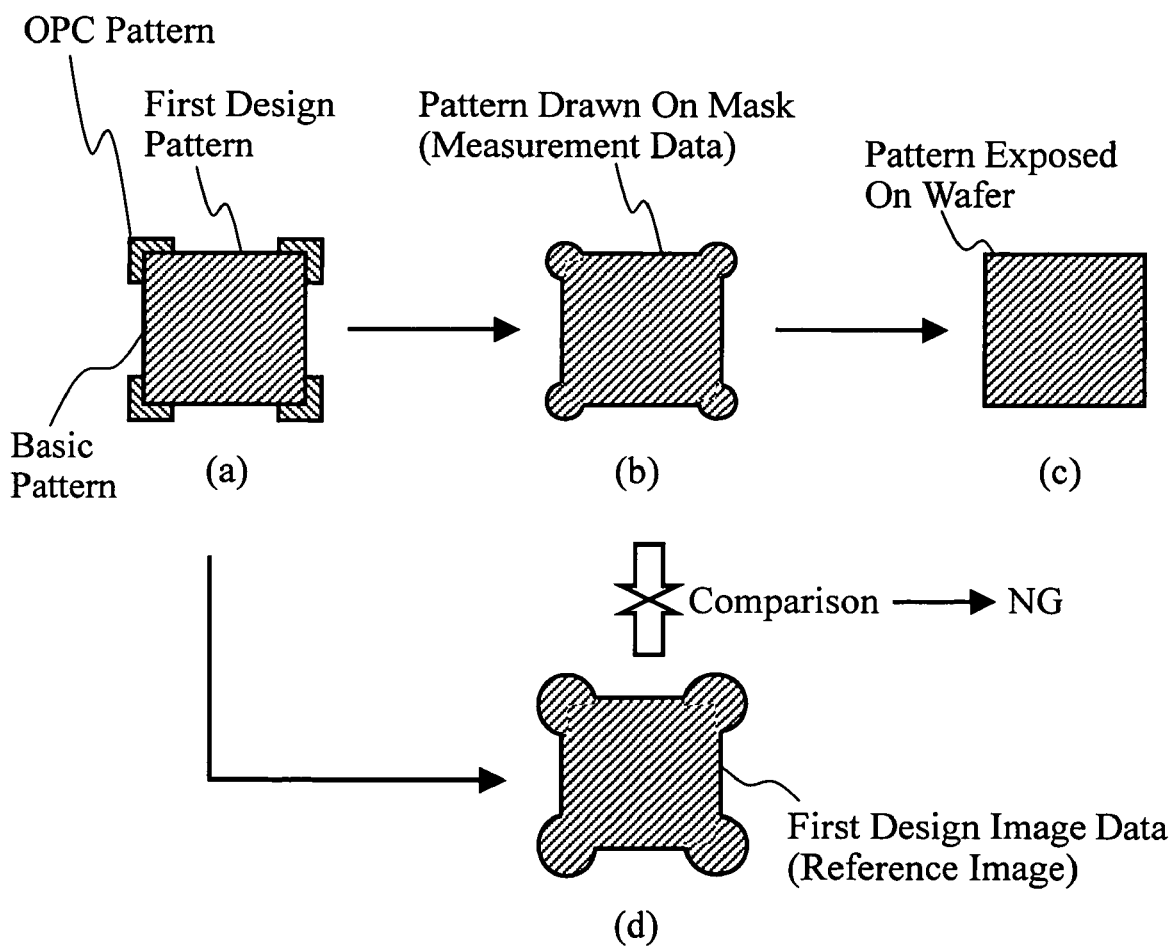
FIG. 8 are diagrams for explaining drawing states and inspection states obtained when a first design pattern on which an OPC pattern is arranged is used.

FIG. 8 are diagrams for explaining drawing states and inspection states obtained when a first design pattern on which an OPC pattern is arranged is used.

In the first design pattern, rectangular OPC patterns are arranged at the four corners of a rectangular basic pattern such that each OPC pattern projects in an x-y direction, so that a shape exposed on a wafer or the like can be made a rectangular pattern as shown at part c of FIG. 8 as at part a of in FIG. 7. When the rectangular basic pattern with the OPC patterns as shown at part a of FIG. 8 is drawn on a mask serving as a target plate by a drawing device, as shown at part b of FIG. 8, most part of the OPC pattern portions is not drawn and is partially left on the four corners of the basic pattern. The resultant shape is a graphic shape of measurement data. When a wafer or the like is exposed by using the mask, the rectangular pattern is exposed as shown at part c of FIG. 8. On the other hand, when the first design image data serving as reference image is formed from the first design pattern, as shown at part d of FIG. 8, the edge of the basic pattern is not transformed, the corners of the OPC pattern round, and the OPC pattern almost has a circular shape. When the measurement data of the shape shown at part b of FIG. 8 is compared with the first design image data having the shape as shown at part d of in FIG. 8 by the comparing circuit 108, the measurement data is considerably different from the first design image data at the OPC pattern portions. For this reason, the data is determined as a defect (NG). However, since the OPC pattern is not essentially important portion in defect inspection, the OPC pattern is not desired to be determined as a defect.

Figure 9:
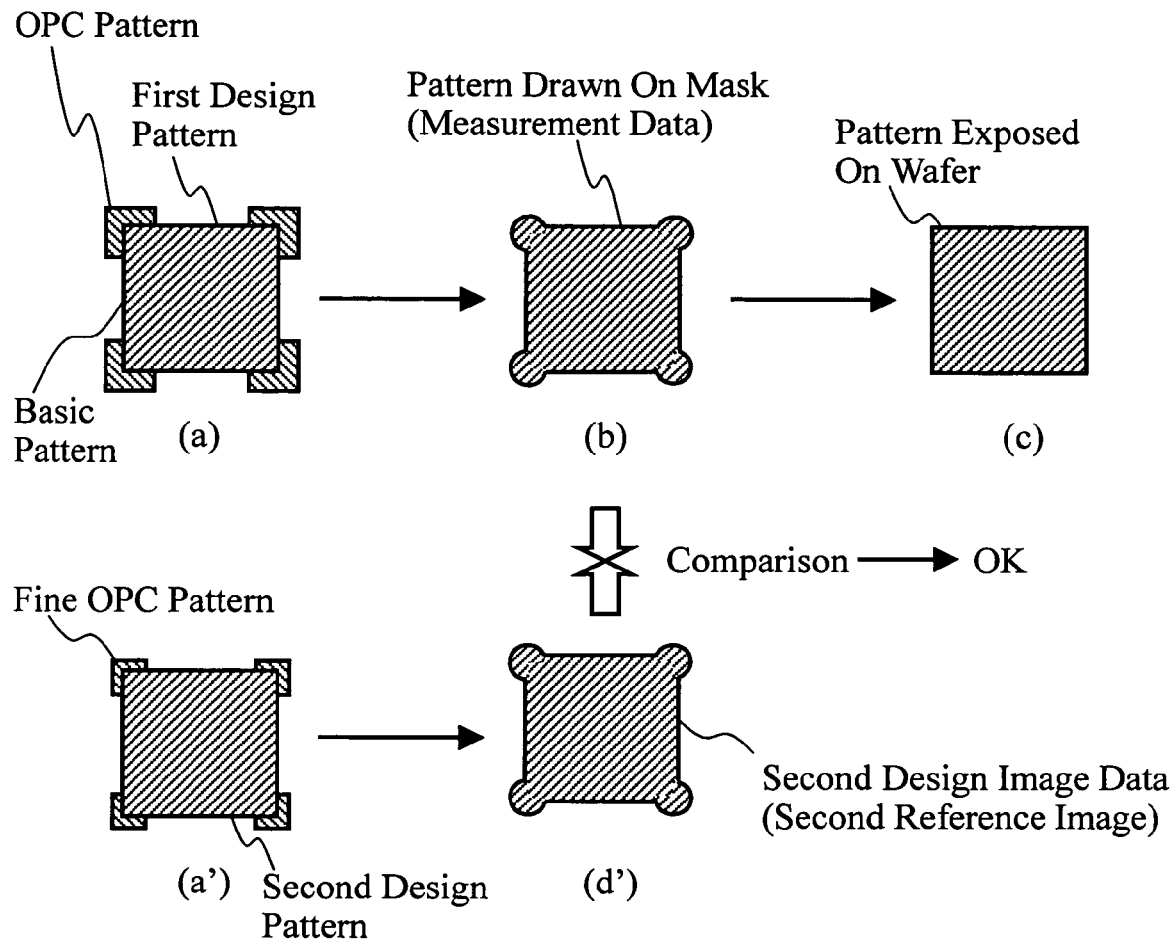
FIG. 9 are diagrams for explaining drawing states obtained when the first design pattern on which an OPC pattern is arranged is used and inspection states obtained when a second design pattern is used.

FIG. 9 are diagrams for explaining drawing states obtained when the first design pattern on which an OPC pattern is arranged is used and inspection states obtained when a second design pattern is used.

In FIG. 9, a part a of FIG. 9 is similar to the part a of FIG. 8. a part b of FIG. 9 is similar to the part b of FIG. 8. a part c of FIG. 9 is similar to the part c of FIG. 8. a part a' of FIG. 9 shows a graphic shape in the second design pattern. The graphic shape is formed to be a graphic in which fine OPC patterns are arranged at the four corners of the basic pattern to obtain the same shape as at part b of FIG. 9 as shown at part d' of in FIG. 9 when the first design image data is converted into the second design image data. In other words, for the first design pattern including a pattern for optical proximity correction, a second design pattern including a pattern obtained by transforming the pattern for optical proximity correction in the first design pattern into a predetermined shape is prepared. As the predetermined shape, a shape made smaller than the shape of the pattern for optical proximity correction in the first design pattern is characteristically used.

In place of the first design image data having the shape shown at part d of in FIG. 8, the second design image data (second reference image) shown at part d' of FIG. 9 and generated based on the second design pattern shown at part a' of in FIG. 9 is compared with the measurement data (optical image) shown at part b of FIG. 9 to make it possible to reduce the generation of the pseudo defect described above.

When the OPC pattern shown at part a of FIG. 9 (at part a of FIG. 8) is formed on a target plate, the OPC pattern as shown at part c of FIG. 9 is not drawn, and the basic pattern may be drawn. For this reason, it is practically preferable that a fine OPC pattern serving as the fine graphic is deleted from the second design pattern.

Figure 10:
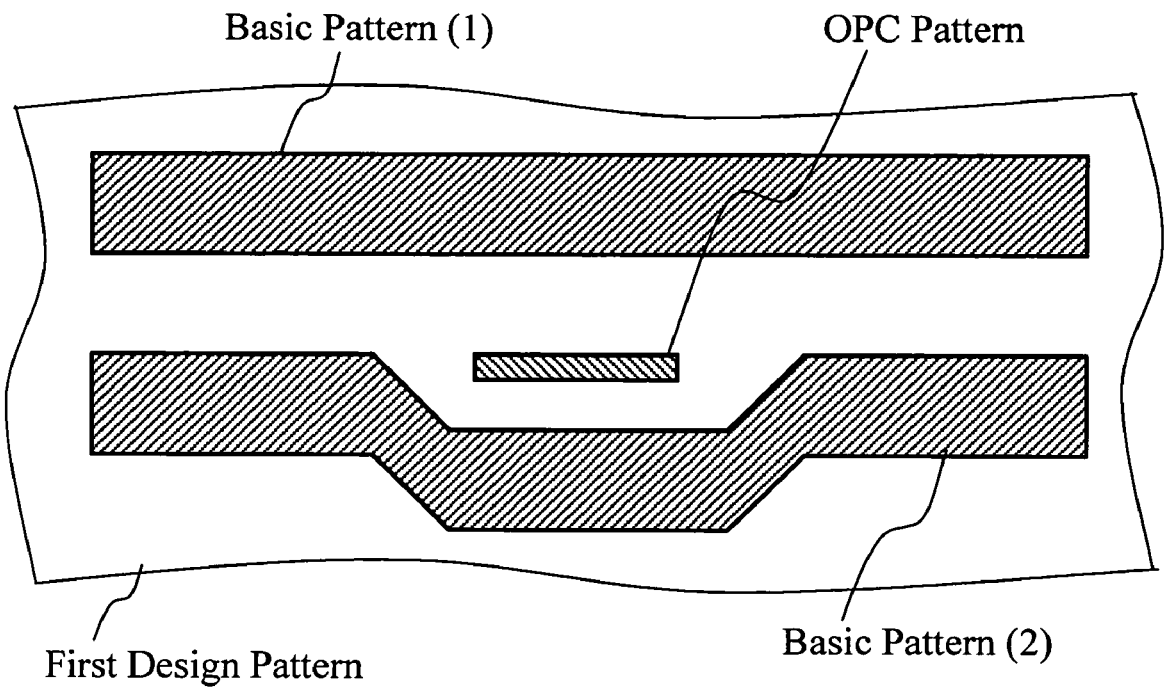
FIG. 10 is a diagram showing another example of the first design pattern on which the OPC pattern is arranged.

FIG. 10 is a diagram showing another example of the first design pattern on which the OPC pattern is arranged.

In FIG. 10, as the first design pattern, two adjacent line patterns are formed. As one basic pattern (1), a straight line pattern is formed. As the other basic pattern (2), a pattern is formed such that a trace is externally bent once without change in line width and returns to the original position. The trace is externally bent to make a space inside. An OPC pattern serving as an assist pattern having a line width smaller than that of the basic pattern such that a space (distance) between the pattern and the straight line pattern is equal to a space of another portion is arranged in a space portion where the space (distance) between the pattern and the straight line pattern increases.

Figure 11:
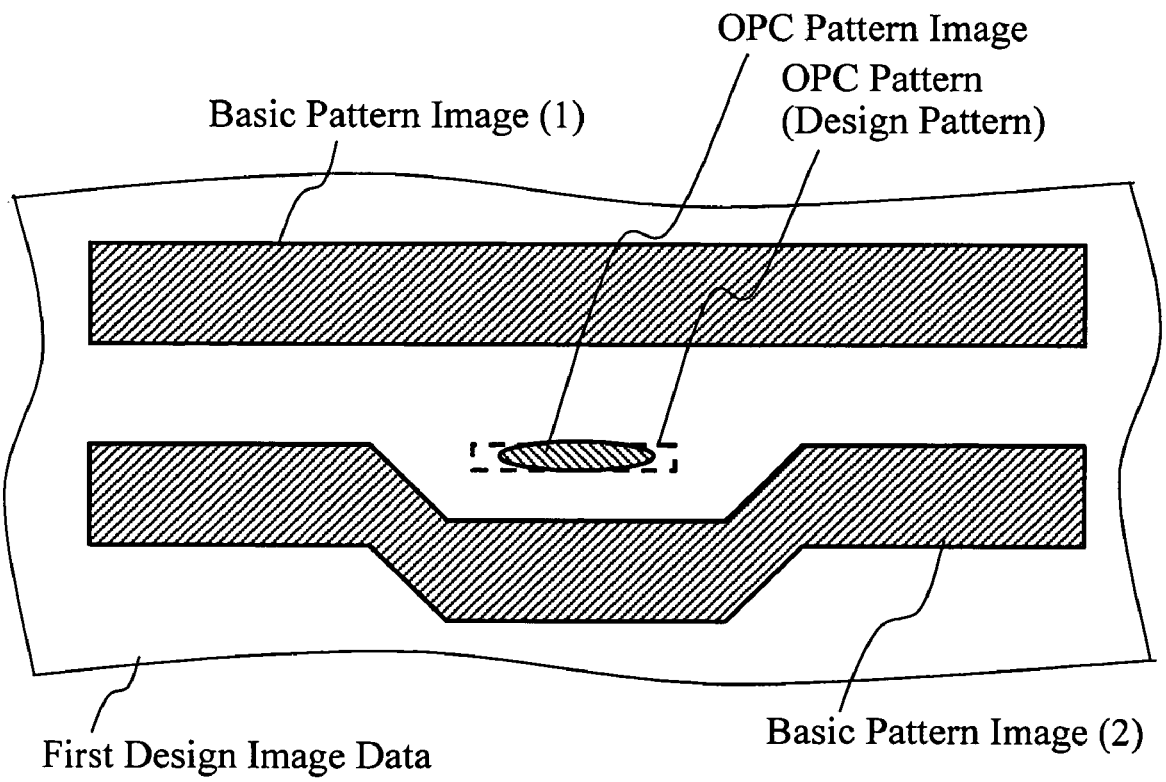
FIG. 11 is a diagram showing the shape of measurement data based on the first design pattern on which the OPC pattern shown in FIG. 10 is arranged.

FIG. 11 is a diagram showing the shape of measurement data based on the first design pattern data on which the OPC pattern shown in FIG. 10 is arranged.

As shown in FIG. 11, when a graphic pattern in the first design pattern on which the OPC pattern shown in FIG. 10 is arranged is drawn on a mask serving as a target plate by a drawing device, the OPC pattern decreases in size like an OPC pattern image shown in FIG. 11. On the other hand, in the first design image data converted from the first design pattern, the OPC pattern slightly decreases in size although the four corners of the OPC pattern round. Therefore, in this state, when the first design image data converted from the first design pattern is compared with the measurement data shown in FIG. 11, it may be determined that the mask is defective (NG).

As described above, the OPC pattern has pattern lines which are considerably narrower or shorter than those of a pattern mainly used as the target plate as shown in FIG. 10. In addition, the pattern actually drawn on the target plate based on the design pattern, as shown in FIG. 11, is not accurately formed in many cases. When this pattern is inspected by the same comparison threshold value as that of another pattern, an inspection apparatus may recognize the target plate as a defect.

A second design pattern including second design image data that exhibits the same graphic shape as that of the measurement data shown in FIG. 11 is prepared, and the second design pattern is compared in place of the first design image data, so that pseudo defects can be reduced in number. In other words, a second design pattern including a pattern obtained by transforming the pattern for optical proximity correction in the first design pattern into a predetermined shape is prepared. As the predetermined shape, a shape smaller than the shape of the pattern for optical proximity correction in the first design pattern is characteristically used.

The OPC pattern as shown in FIG. 10 is automatically generated in many cases when design pattern data is generated. For this reason, when the OPC pattern is generated, a pattern the shape and size of which are converted into a shape and a size to be generated when the pattern is set in the inspection apparatus shown in FIG. 11 is independently prepared as the second design pattern. This is very important to reduce pseudo defects in number.

Figure 12:
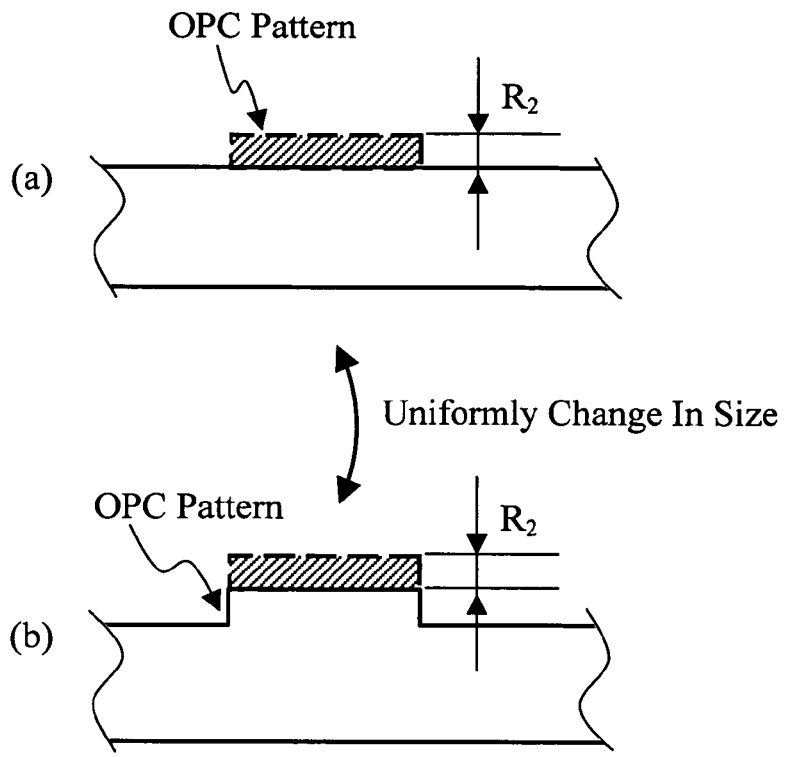
FIG. 12 are diagrams showing examples of a method of forming a second design pattern corresponding to the first design pattern with OPC pattern.

FIG. 12 are diagrams showing examples of a method of forming a second design pattern corresponding to the first design pattern with OPC pattern.

When OPC patterns convexly projecting and having different widths as shown at part a of FIG. 12 and part b of 12 are formed on a line pattern having a predetermined width, a graphic pattern (pattern obtained by deleting a hatched portion) from which a uniform size R2 is deleted may be used as the second design pattern. In this case, the widths of the convexly projecting OPC patterns in part a and b of FIG. 12 are made considerably different from each other for descriptive convenience. However, actually, the widths rarely considerably change depending on the generations of semiconductor devices. For this reason, a pattern may be preferably formed such that the uniform size R2 is deleted. Alternatively, the second design pattern may be formed as follows.

Figure 13:
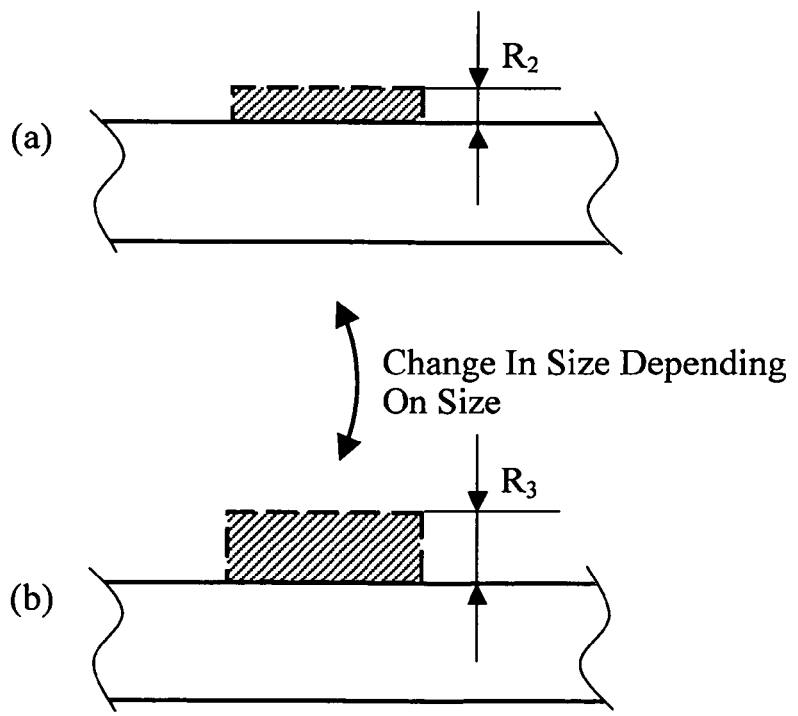
FIG. 13 are diagrams showing other examples of the method of forming the second design pattern corresponding to the first design pattern with OPC pattern.

FIG. 13 are diagrams showing another example of the method of forming the second design pattern corresponding to the first design pattern with OPC pattern.

As shown at part a of FIG. 13 and part b of 13, when OPC patterns convexly projecting and having different widths are formed on a line pattern having a predetermined width, a graphic pattern (pattern from which a hatched portion is deleted) from which the OPC pattern is deleted depending on the size of the OPC may be used as the second design pattern.

As described above, the second design pattern is prepared, and the first design image data formed from the original first design pattern and the measurement data are compared with the two design image data to make it possible to reduce pseudo defects in number.

Second Embodiment

In the first embodiment, the case of an OPC pattern has been described above. However, patterns in which pseudo defects can be generated are not limited to the OPC pattern. As another example, as in a second embodiment, a case in which a resized pattern is to be inspected will be described below. Since an apparatus configuration and the steps of a pattern inspection method are the same as those in the first embodiment, the description will not be repeated.

Figure 14:
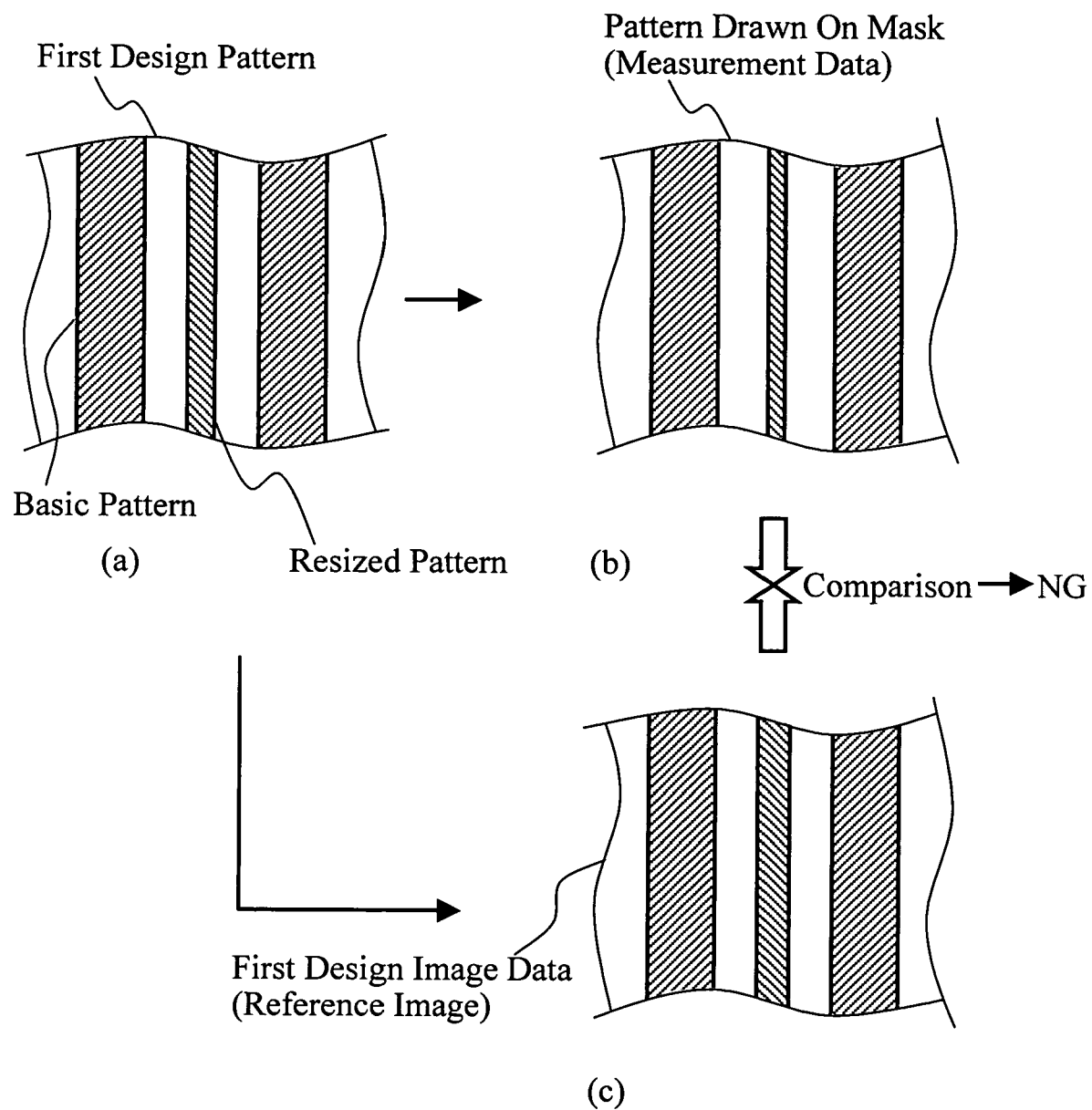
FIG. 14 are diagrams for explaining drawing states of a resized design pattern.

FIG. 14 are diagrams for explaining drawing states of a resized design pattern.

Not only an OPC pattern, but also patterns having different sizes are present on a target plate. Although depending on processes for manufacturing a target plate, a relatively small pattern often further decreases in size. For this reason, it is practical that two different resize amounts of the line width are prepared and used as design data of two types. For example, in the first design pattern, a line pattern having a small line width and sandwiched between line patterns having large line widths as shown at part a of FIG. 14 is drawn on a mask serving as a target plate by a drawing device, the small line width further decreases as shown at part b of FIG. 14. Therefore, when a line pattern having a small line width shown at part b of FIG. 14 is desired, as shown at part a of FIG. 14, the first design pattern is corrected such that the line width is resized to be increased. On the other hand, when the first design image data serving as a reference image is formed from the first design pattern, as shown at part c of FIG. 14, a line width of the line pattern having a small line width does not decrease to the line width shown at part b of FIG. 14. When the measurement data having the shape shown at part b of FIG. 14 and the first design image data having the shape shown at part c of FIG. 14 are compared with each other by the comparing circuit 108, the difference between the data is large at a resized line pattern portion having a small line width. For this reason, the target plate is determined as a defect (NG). However, a resized portion of a resized line pattern having a small line width is not desired to be essentially determined as a defect (NG).

Figure 15:
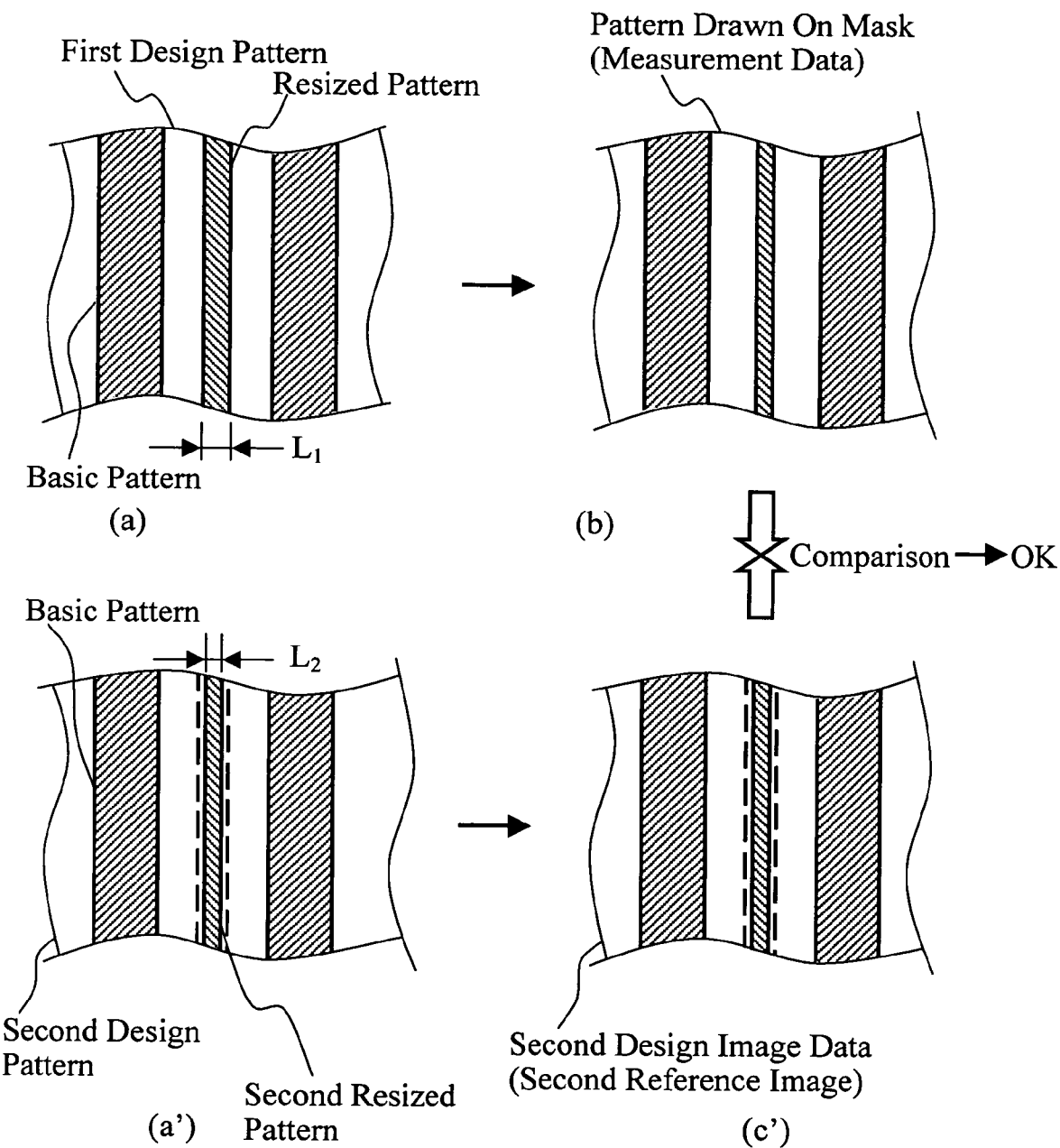
FIG. 15 are diagrams for explaining drawing states obtained when the first design pattern on which the resized pattern is arranged is used and inspection states obtained when the second design pattern is used.

FIG. 15 are diagrams for explaining drawing states obtained when the first design pattern on which the resized pattern is arranged is used and inspection states obtained when the second design pattern is used.

In FIG. 15, a part a of FIG. 15 is a diagram similar to the part a of FIG. 14. a part b of FIG. 15 is a diagram similar to the part b of FIG. 14. a part a' of FIG. 15 shows a graphic shape in the second design pattern. When the first design image data is converted into the second design image data, as shown at part c' of in FIG. 15, a graphic in which a resized portion of a line pattern having a small line width is formed to be the same shape as that at part b of FIG. 15. In other words, to the first design pattern including a pattern resized to have a predetermined line width, a second design pattern including a pattern resized to have a line width different from the resized pattern in the first design pattern is prepared. In place of the first design image data having the shape shown at part c of FIG. 14, the second design image data (second reference image) generated based on the second design pattern shown at part a' of FIG. 15 and shown at part c' of FIG. 15 is compared with measurement data (optical image) shown at part b of FIG. 15 to make it possible to reduce generation of pseudo defects.

Third Embodiment

In a third embodiment, since an apparatus configuration is the same as that of the first embodiment, and a description thereof will not be repeated. Since the steps of a pattern inspection method are the same as those in the first embodiment except for the parts described below, the description of the same parts will not be repeated.

Figure 16:
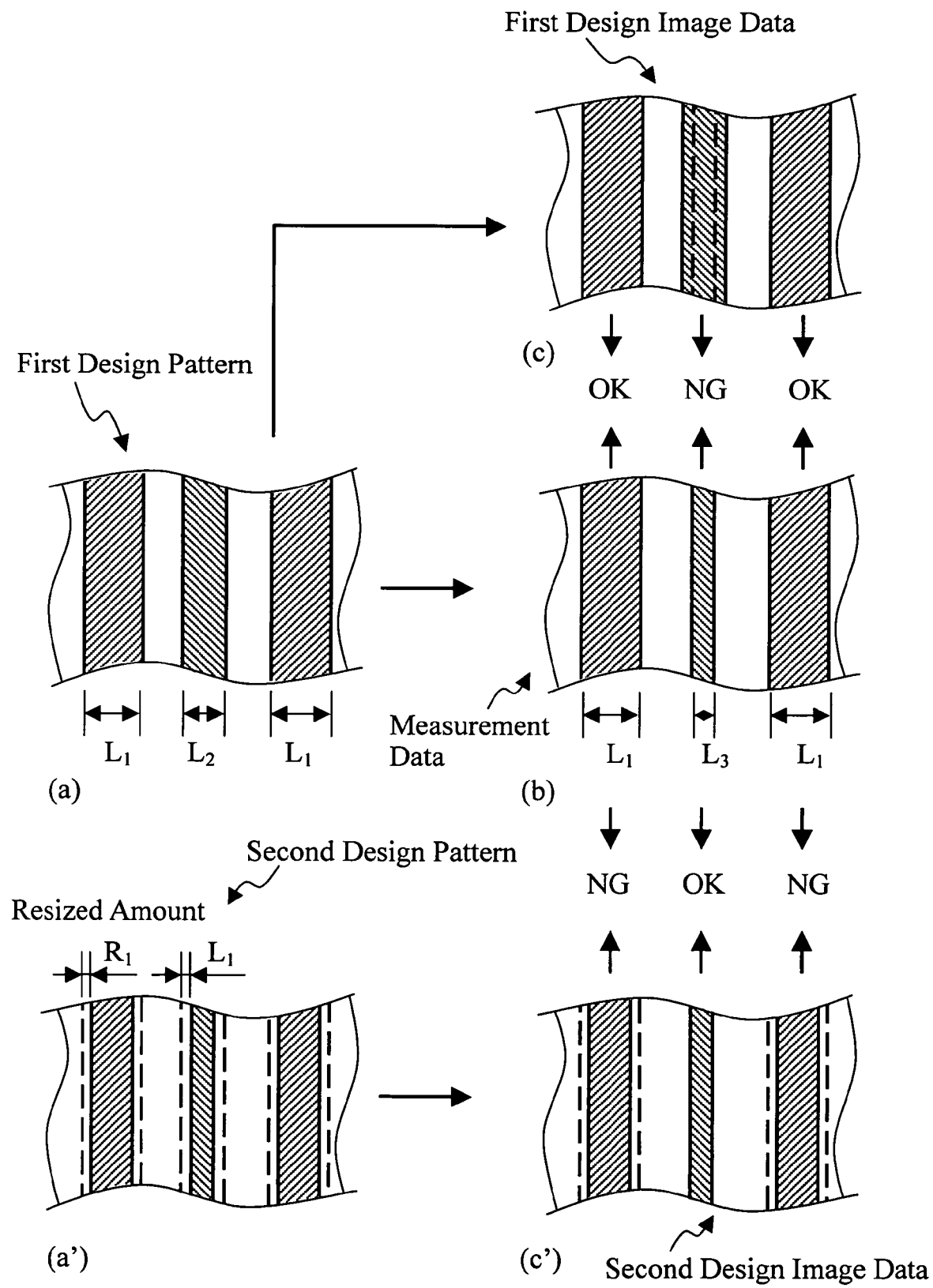
FIG. 16 are diagrams for explaining drawing states obtained when the first design pattern on which the resized pattern is arranged and inspection states obtained when the first and second design patterns are used.

FIG. 16 are diagrams for explaining drawing states obtained when the first design pattern on which a resized pattern is arranged and inspection states obtained when first and second design patterns are used.

In the first design pattern, when a line pattern having a small line width and sandwiched by line patterns having large line widths as shown at part a of FIG. 16 is drawn on a mask serving as a target plate by a drawing device, the line width further decreases as shown at part b of FIG. 16. When the first design image data serving as a reference image is formed from the first design pattern shown at part a of FIG. 16, as shown at part c of FIG. 16, a line width in the line pattern having the small line width is not equal to or smaller than the line width shown at part b of FIG. 16. In other words, one can say that the first design pattern shown at part a of FIG. 16 is formed with reference to a line pattern having a line width such that the first design pattern is matched with a line pattern having a large line width. Therefore, in the third embodiment, as shown at part a' of FIG. 16, the second design pattern is converted into the second design image data, the respective line patterns are uniformly resized to be matched with the line pattern having a small line width, and the second design pattern with reference to a line pattern having a small line width. When the measurement data having the shape shown at part b of FIG. 16 is compared with the first design image data having the shape shown at part c of FIG. 16 by the comparing circuit 108, defect is not detected (OK) in the line pattern having the large line width, and a defect is detected (NG) in the line pattern having the small line width because a difference is large. On the other hand, the measurement data having the shape shown at part b of FIG. 16 and the second design image data having the shape shown at part c' of FIG. 16 are compared with each other by the comparing circuit 108, the data are different from each other in line patterns having large line widths. For this reason, a defect (NG) is detected. In line patterns having small line widths, defect is not detected in the inspections. It is preferable that the absence of a defect is determined when defect is not detected in any one of the inspections to reduce the number of pseudo defects.

Fourth Embodiment

In a fourth embodiment, another inspection method will be described below in a case of a resized pattern. In the fourth embodiment, the same apparatus configuration as that in the first embodiment is used, and a description thereof will not be repeated. Since the steps of the pattern inspection method are the same as those in the first embodiment except for the parts described below, the same parts will not be explained here.

When a line pattern has an excessively large width, the line pattern is connected to an adjacent pattern. When a line pattern has an excessively small width, the line pattern may be disconnected. If a pattern has a desired line width falling in the range of the excessively large width to the excessively small width, permissible upper and lower (lower and upper) limits are defined. A line pattern having a standard line width is prepared as the first design pattern, a graphic is formed such that the line widths of second and third design patterns are set at the permissible upper and lower (lower and upper) limits when second and third design pattern data are converted into second and third design image data as the second and third design patterns, respectively. A defective candidate obtained when the measurement data is compared with the first design image data converted from the first design pattern data is excluded from defective candidates in the comparing processes between the measurement data and the second and third design image data serving as upper- and lower-limit patterns when respective pixel values fall within the range to make it possible to perform inspection fitting the needs.

Figure 17:
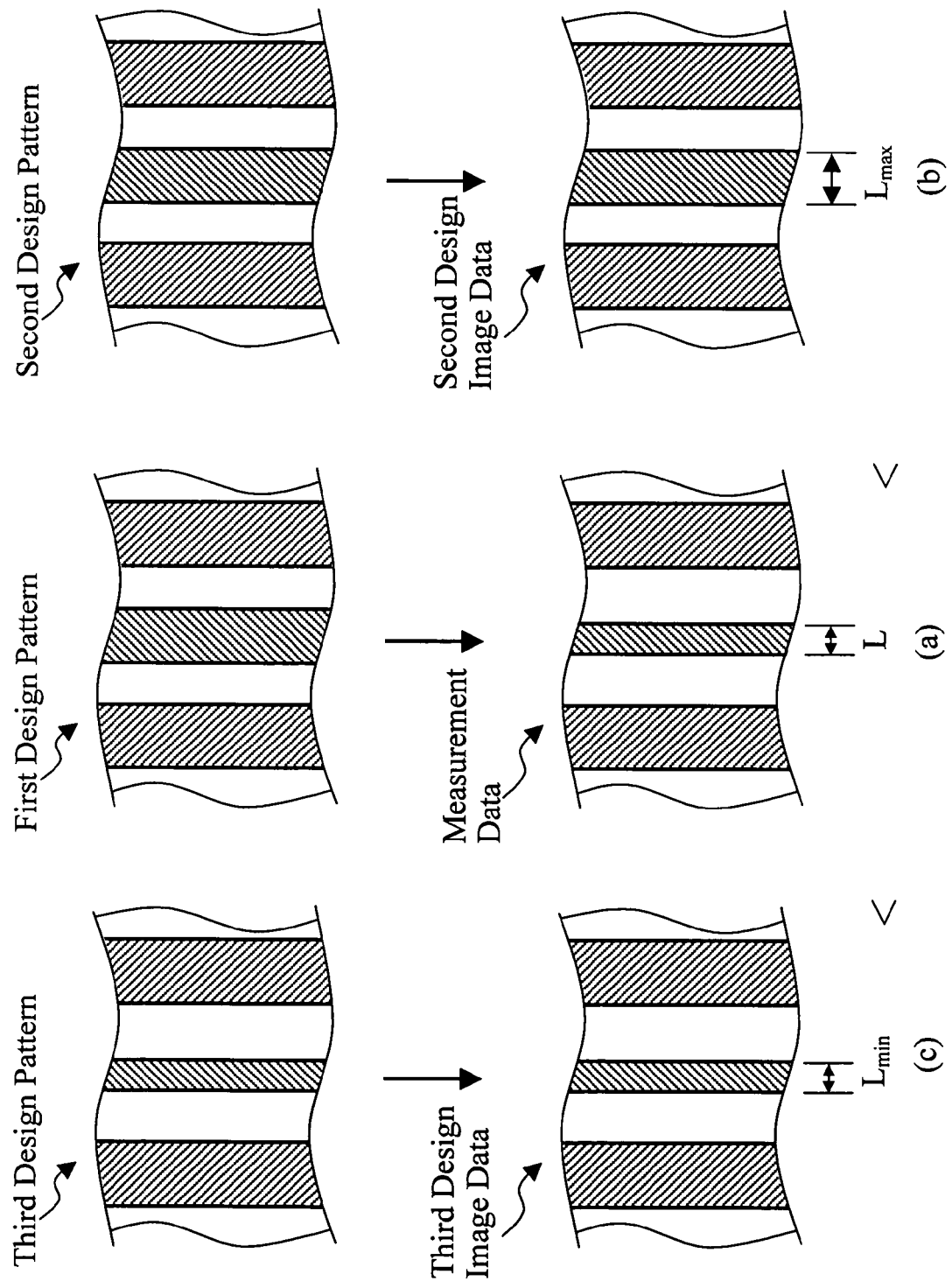
FIG. 17 are diagrams for explaining an inspection method for inspecting measurement data of a target plate drawn by using the first design pattern on which a resized pattern is arranged by using second and third design image data formed from second and third design patterns.

FIG. 17 are diagrams for explaining an inspection method for inspecting measurement data of a target plate drawn by using the first design pattern on which a resized pattern is arranged by using second and third design image data formed from second and third design patterns.

As shown at part a of FIG. 17, it is assumed that a line pattern having a small line width and sandwiched between line patterns having large line widths in the first design pattern is drawn on a mask serving as a target plate by a drawing device, the line width decreases to a line width L. In this case, as shown at part b of FIG. 17, a second design pattern is prepared such that a line pattern having a small line width and sandwiched between line patterns having large line widths in the second design image data is set at an upper-limit value Lmax of a permissible size in comparison with measurement data by a comparing circuit 108. Furthermore, as shown at part c of FIG. 17, a third design pattern is prepared such that a line pattern having a small line pattern and sandwiched between line patterns having large line widths in the third design image data is set at a lower-limit value Lmin of the permissible size in comparison with the measurement data by the comparing circuit 108. A defective candidate in comparison with the first design image data converted from the first design patter is excluded from defective candidates in the comparing processes between the measurement data and the second and third design image data serving as upper- and lower-limit patterns when respective pixel values fall within the range to make it possible to reduce the number of pseudo defects.

In the embodiments described above, the design data of two types are handled. However, as in the fourth embodiment, it is also preferable that comparative inspection with measurement data serving as optical image data by using, in place of the first design image data, not only the second design image data but also the third or subsequent design image data generated based on the third and subsequent design patterns.

However, when the third or subsequent design image data are used, it is more preferably considered that the apparatus increases in size or inspection time is regulated.

Fifth Embodiment

In a fifth embodiment, since an apparatus configuration and the steps of a pattern inspection method are the same as those in the first embodiments, a description thereof will not be repeated.

Figure 18:
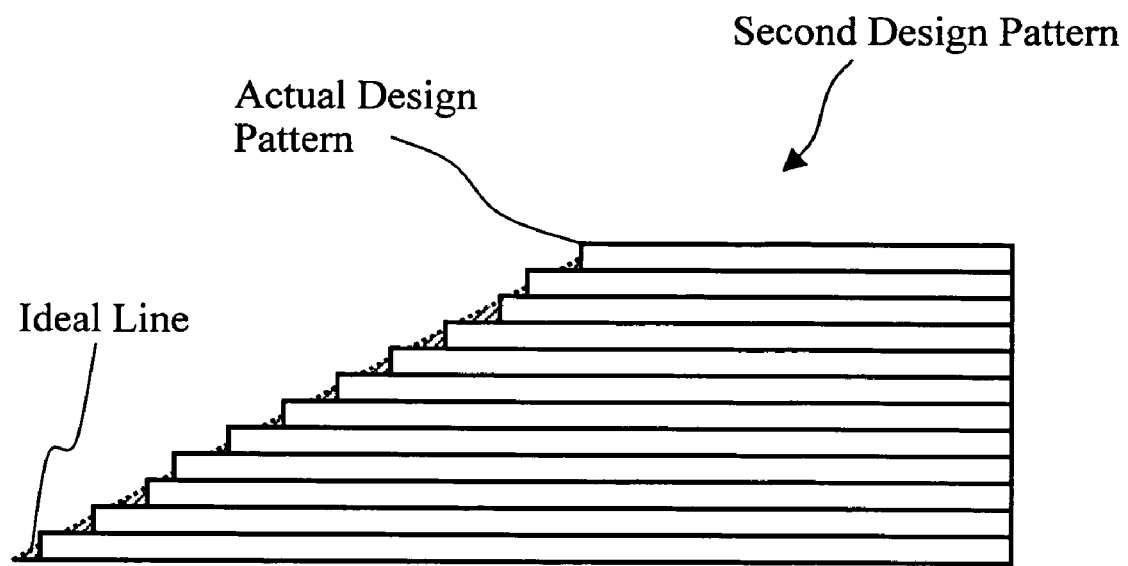
FIG. 18 is a diagram showing an example obtained when a graphic pattern is converted into a pattern in an apparatus input format.

FIG. 18 is a diagram showing an example obtained when a graphic pattern is converted into a pattern of an apparatus input format.

Figure 19:
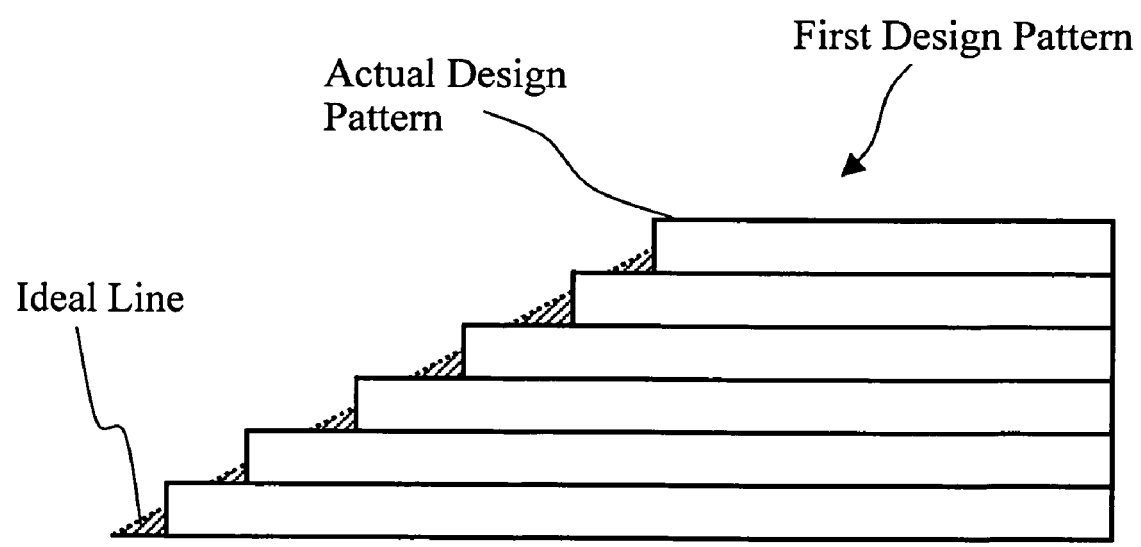
FIG. 19 is a diagram showing another example obtained when a graphic pattern is converted into a pattern in the apparatus input format.

FIG. 19 is a diagram showing another example obtained when a graphic pattern is converted into a pattern in the apparatus input format.

As information of a design pattern input to a pattern inspection apparatus 100, data the format of which is converted from the format of a graphic pattern originally formed in design of a target plate into an apparatus input format by some data conversion is generally input. As shown in FIG. 18, when the number of graphics to be divided to improve precision in the conversion is increased, a data amount disadvantageously increases, and converting time is excessively long. As shown in FIG. 19, when the number of graphics to be divided is decreased at the cost of the precision in the conversion, a pseudo defect may be generated by deterioration of precision of reference image data in comparative inspection with measurement data. Therefore, the apparatus is operated at precision approximate to the precision required by a target plate to be inspected. However, the precision may be locally insufficient, and a pseudo defect may be generated. For this reason, to cope with such a case, a second design pattern having conversion precision higher than that of a first design pattern is prepared. In this case, pseudo results can be reduced in number to make it possible to effectively use the apparatus. For example, data of the number of divisions as shown in FIG. 19 may be used as the first design pattern, and, as shown in FIG. 18, data having divided graphics the number of which is larger than the number of graphics shown in FIG. 19 may be used as the second design pattern.

Sixth Embodiment

In a sixth embodiment, since an apparatus configuration and the steps of a pattern inspection method are the same as those in the first embodiment, a description thereof will not be repeated.

Figure 20:
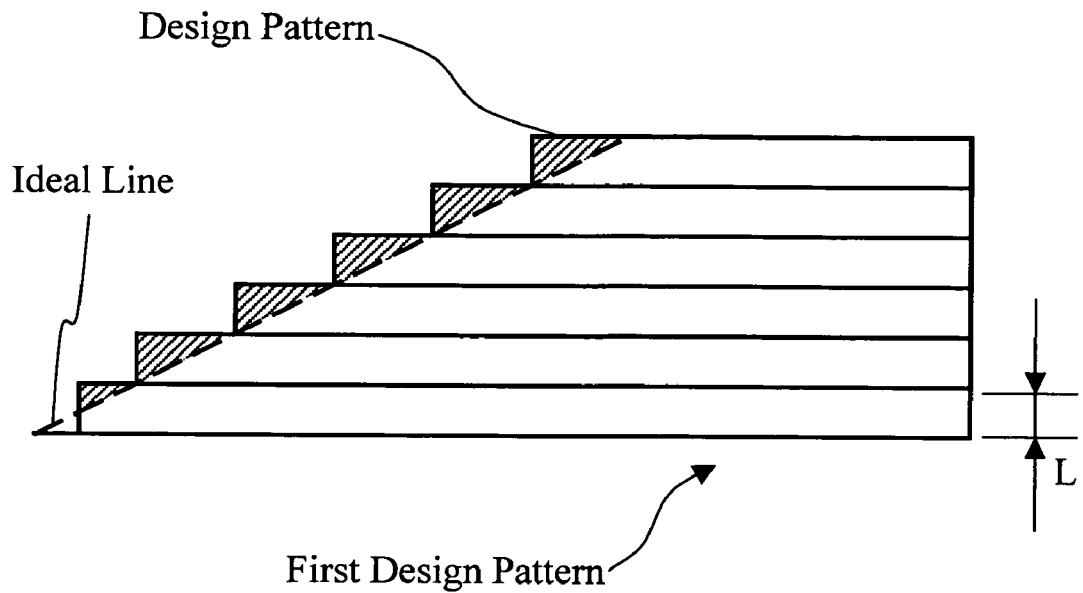
FIG. 20 is a diagram showing an example obtained when a graphic pattern having an oblique side is converted into a pattern in the apparatus input format.

FIG. 20 is a diagram showing an example obtained when a graphic pattern having an oblique side is converted into a pattern in an apparatus input format.

As a conventional oblique pattern, a 450 oblique pattern is mainly used. However, in recent years, some target plate uses an angle other than the angle of 450. This pattern easily causes an error in the design patterns. For this reason, the second design pattern is used in this portion to reduce the number of pseudo defects, so that the apparatus can be advantageously used.

Figure 21:
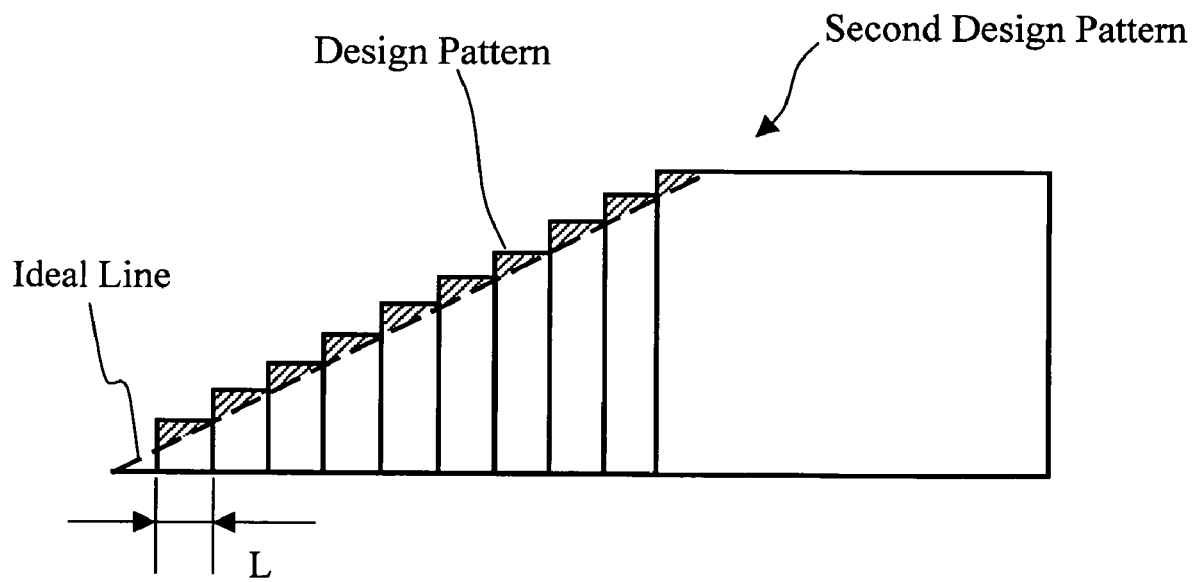
FIG. 21 is a diagram showing another example obtained when a graphic pattern having an oblique side is converted into a pattern in the apparatus input format.

FIG. 21 is a diagram showing another example obtained when a graphic pattern having an oblique side is converted into a pattern in an apparatus input format.

In FIG. 20, the design pattern is vertically divided on the drawing. However, in FIG. 21, the pattern is horizontally divided to make division widths equal to each other, so that an amount of error can be changed in an oblique pattern having an angle other than 450. Therefore, a dividing method having a small amount of error is used as a second design pattern to make it possible to reduce the number of pseudo defects. In other words, for the same graphic pattern, second design pattern data including a pattern defined by using a defining method different from that of the first design pattern data is prepared, so that the number of pseudo defects can be reduced.

Seventh Embodiment

In a seventh embodiment, since an apparatus configuration and the steps of a pattern inspection method are the same as those in the first embodiment, a description thereof will not be repeated.

Figure 22:
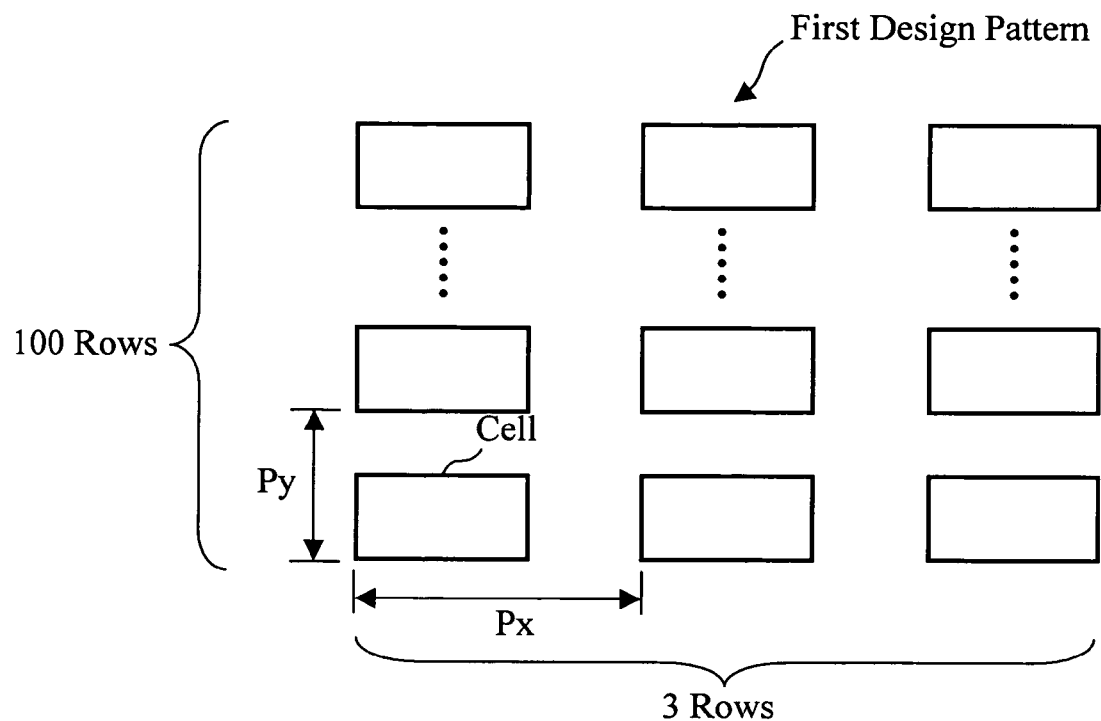
FIG. 22 is a diagram showing an example of a first design pattern on which cells are arranged in an array.

FIG. 22 is a diagram showing an example of a first design pattern on which cells are arranged in an array.

FIG. 22 shows a case in which cells constituting one group obtained by gathering graphics are arranged in 3 rows at a pitch of Px in an x direction and in 100 rows at a pitch of Py in a y direction. In this array arrangement, the location of measurement data and the location of the first design image data tend to be different from each other as the number of rows increases. For this reason, when the target plate is inspected, a pseudo defect may be detected. Therefore, in this case, the second design pattern is used to reduce the number of pseudo defects, so that the apparatus can be advantageously used.

Figure 23:
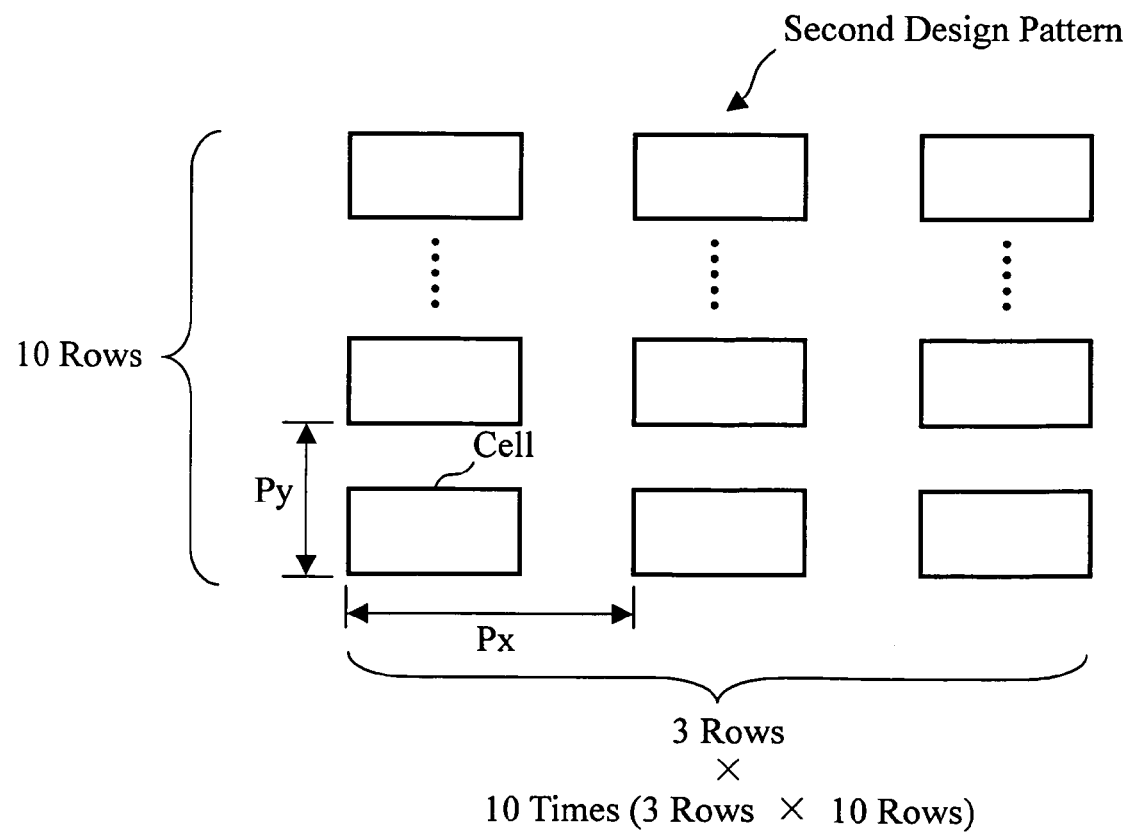
FIG. 23 is a diagram showing an example of a second design pattern on which cells are arranged in an array.

FIG. 23 is a diagram showing an example of a second design pattern on which cells are arranged in an array.

FIG. 23 shows a case in which cells constituting one group obtained by gathering graphics are arranged in 3 rows at a pitch of Px in an x direction and in 10 rows at a pitch of Py in a y direction 10 times. The number of repeated arrangements is divided to reduce the number of rows per arrangement, so that a difference between locations of the measurement data and the second design image data can be reduced. As a result, the number of pseudo defects can be reduced. In this case, as an example, the number of repeated arrangements is divided by ten. However, the number of divisions is not limited to ten as a matter of course.

Eighth Embodiment

In an eighth embodiment, since an apparatus configuration is the same as that in the first embodiment, a description thereof will be omitted. Since the steps of a pattern inspection method are the same as those in the first embodiment except for the parts described below, and a description of the same parts will not be repeated.

In a process of generating second design image data, when the second design image data is generated and always input in the comparing circuit 108, inspection time can be designed to be stabilized. However, the second design image data is rarely necessary throughout the surface of a target plate. Therefore, in order to prevent the apparatus from being excessively increased in size, in the flow chart in FIG. 2, it is practical that the second design image data is generated to a part where a defective candidate appears in comparison with the first comparison pattern. In other words, the second design image data is preferably generated when a difference serving as a result obtained by comparing the measurement data with the first design image data in the comparing circuit 108 in the comparing step (1) in S218 exceeds a predetermined threshold value. The measurement data may be compared with the second design image data in the comparing circuit 108 in the comparing step (2) in S228.

As described above, the number of target plates which are conventionally determined as pseudo defects in inspection using the second design image data can be reduced, and the apparatus can be advantageously used such that a repetition of the inspection can be avoided.

Figure 24:
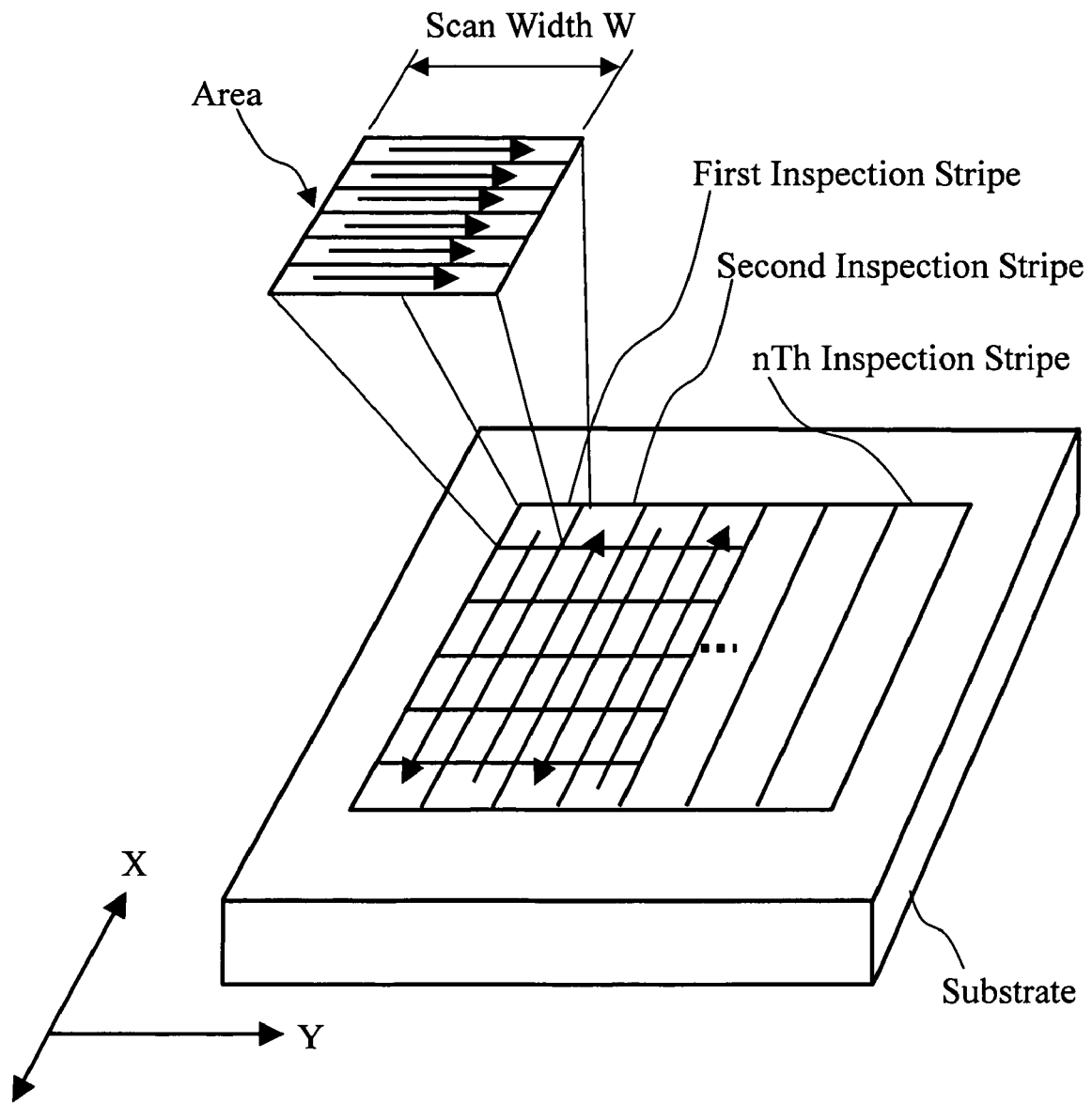
FIG. 24 is a diagram for explaining another optical image acquisition method.

FIG. 24 is a diagram for explaining another optical image acquisition method.

In the configuration in FIG. 1, the photodiode array 105 which simultaneously causes beams the number of which is the number of pixels (for example, 2048 pixels) of a scan width W is used. However, the optical image acquisition method is not limited to using the photodiode array 105. As shown in FIG. 24, the following method may be used. That is, while the XYθ table 102 is slid at a constant rate in an X direction, a laser beam scans by a laser scanning optical device (not shown) in a Y direction each time movement of a predetermined pitch is detected by a laser interferometer, and transmitted light is detected to acquire a two-dimensional image every area having a predetermined size.

According to at least one of the embodiments described above, the second design image data is used in place of the first design image data to make it possible to reduce the number of target plates which are conventionally determined as pseudo defects, and the apparatus can be advantageously used, as repetition of the inspection can be avoided, for instance.

In the above explanation, the various circuits and the various steps described above can be constituted by programs which can be operated by a computer. Alternatively, the circuits and the steps may be realized not only by programs serving as software but also by a combination of hardware and software. Alternatively, a combination of software and firmware may be used. When the circuits and the steps are constituted by programs, the programs are recorded on a recording medium such as a magnetic disk device, a magnetic tape device, an FD, or a ROM (Read Only Memory). For example, the table control circuit 114, the developing circuit 111, the developing circuit 140, the reference circuit 112, the reference circuit 142, the comparing circuit 108, and the like may be constituted by electric circuits or the like or may also be realized as software processed by the control computer 110. These circuit may also be realized by combinations of electric circuits and software.

The embodiments have been described with reference to the concrete examples. However, the present invention is not limited to these concrete examples. For example, in the embodiments, although transmitted light is used, reflected light may be used, or transmitted light and reflected light may be simultaneously used. In the embodiments, in order to develop the second design pattern data, the developing circuit 140 and the reference circuit 142 are arranged independently of the developing circuit 111 and the reference circuit 112 for developing the first design pattern data. The present invention is not limited to this configuration, and the developing circuit 111 and the reference circuit 112 for developing the first design pattern data may be diverted to the development of the second design pattern data. More specifically, the second design image data may be generated by diverting the developing circuit 111 and the reference circuit 112 serving as an example of a design image data generating unit for generating the first design image data.

In the apparatus configurations, the control methods, and the like, parts or the like which are not directly required to explain the present invention are not described. However, a necessary apparatus configuration and a necessary control method can be appropriately selected and used.

All pattern inspection apparatuses and all pattern inspection methods which have the constituent elements of the present invention and which can be appropriately changed in design by a person skilled in the art are included in the spirit and scope of the invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus, comprising:
   an optical image acquiring unit configured to acquire optical image data of a target plate to be inspected, the target plate being formed as a pattern;
   a design image data generating unit configured to generate first design image data based on a first design pattern serving as a base of pattern formation of the target plate; and
   a comparing unit configured to compare the optical image data and the first design image data with each other; and
   a storing unit having stored therein a second design pattern, wherein
   the second design pattern was input into the pattern inspection apparatus in parallel with the first design pattern,
   said second design pattern includes a pattern obtained by transforming a pattern in said first design pattern into a predetermined shape,
   second design image data is generated based on said second design pattern in the pattern inspection apparatus, and
   in the comparing unit, said second design image data generated based on said second design pattern in the pattern inspection apparatus is further input, and the optical image data is compared with the second design image data in place of the first design image data.

2. The pattern inspection apparatus according to claim 1, wherein in the comparing unit, when a difference resulting from a comparison between the optical image data and the first design image data exceeds a predetermined threshold value, the optical image data is compared with the second design image data in place of the first design image data.

3. The pattern inspection apparatus according to claim 1, wherein the pattern inspection apparatus further comprises a second design image data generating unit which generates the second design image data independently of a first design image data generating unit when the design image data generating unit is used as the first design image data generating unit.

4. The pattern inspection apparatus according to claim 1, wherein the second design image data is generated by diverting the design image data generating unit.

5. The pattern inspection apparatus according to claim 1, wherein the first design pattern includes a pattern for optical proximity correction, and the second design pattern includes a pattern obtained by transforming the pattern for optical proximity correction in the first design pattern into a predetermined shape.

6. The pattern inspection apparatus according to claim 1, wherein
   the first design pattern includes a pattern having a predetermined line width and a pattern for optical proximity correction having a line width equal to or smaller than the predetermined line width; and
   the second design pattern includes a pattern obtained by transforming the pattern for optical proximity correction having the line width equal to or smaller than the predetermined line width in the first design pattern into a predetermined shape.

7. The pattern inspection apparatus according to claim 1, wherein
the first design pattern includes a pattern resized to have a predetermined line width; and
the second design pattern includes a pattern resized to have a line width different from that of the resized pattern in the first design pattern.

8. The pattern inspection apparatus according to claim 1, wherein as the sizes of the first and second design patterns, sizes which exhibit permissible upper and lower limits in comparison in the comparing unit are used.

9. The pattern inspection apparatus according to claim 1, wherein the second design pattern includes a pattern defined by using a defining method different from that for the first design pattern with respect to the same graphic pattern.

10. The pattern inspection apparatus according to claim 1, wherein the second design image data is generated when a difference resulting from a comparison between the optical image data and the first design image data in the comparing unit exceeds a predetermined threshold value.

11. The pattern inspection apparatus according to claim 1, wherein in the comparing unit, in place of the first design image data, third and subsequent design image data generated based on third and subsequent design patterns are further compared with each other.

12. A pattern inspection method for a pattern inspection apparatus, the pattern inspection method comprising:
acquiring, with the pattern inspection apparatus, optical image data of a target plate to be inspected, the target plate being formed as a pattern;
generating first design image data with the pattern inspection apparatus based on a first design pattern serving as a base of pattern formation of the target plate;
comparing, with the pattern inspection apparatus, the optical image data and the first design image data with each other;
generating second design image data with the pattern inspection apparatus based on a second design pattern, information of the second design pattern being input to the pattern inspection apparatus in parallel with information of the first design pattern, said second design pattern including a pattern obtained by transforming a pattern in said first design pattern into a predetermined shape; and
comparing, with the pattern inspection apparatus, the optical image data and the second design image data in place of the first design image data.

13. A computer-readable storage medium on which a program is recorded, the program, when executed by a computer, causes the computer to execute a method comprising:
storing, in which information of the first design pattern serving as a base of pattern formation on a target plate to be inspected, the target plate being formed as a pattern, and information of a second design pattern different from the first design pattern are stored in a storing device, wherein the information of said second design pattern is input in parallel with the information of the first design pattern to a pattern inspection apparatus, said second design pattern includes a pattern obtained by transforming a pattern in said first design pattern into a predetermined shape;
generating first design image data based on the first design pattern stored in the storing device;
receiving optical image data of the target plate;
comparing the optical image data with the first design image data;
generating second design image data based on the second design pattern stored in the storing device; and
comparing the optical image data with the second design image data in place of the first design image data.

* * * * *